(12) United States Patent
Ma et al.

(10) Patent No.: US 12,651,038 B2
(45) Date of Patent: Jun. 9, 2026

(54) COMPUTATION OF DISCRETE FOURIER TRANSFORMATION (DFT) USING NON-VOLATILE MEMORY ARRAYS

(71) Applicant: Western Digital Technologies, Inc., San Jose, CA (US)

(72) Inventors: Wen Ma, Sunnyvale, CA (US); Tung Thanh Hoang, San Jose, CA (US); Martin Lueker-Boden, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 1267 days.

(21) Appl. No.: 17/507,185

(22) Filed: Oct. 21, 2021

(65) Prior Publication Data

US 2023/0126357 A1     Apr. 27, 2023

(51) Int. Cl.
    *G06F 17/16*     (2006.01)
    *G06G 7/16*     (2006.01)

(52) U.S. Cl.
    CPC .............. *G06F 17/16* (2013.01); *G06G 7/16* (2013.01)

(58) Field of Classification Search
    CPC ........ G06G 7/00–46; G06F 17/14–147; G06F 15/7821; G06F 15/785
    See application file for complete search history.

(56) References Cited

U.S. PATENT DOCUMENTS

| | | | | |
|---|---|---|---|---|
| 9,152,827 | B2 * | 10/2015 | Linderman | ............ G06N 3/044 |
| 10,497,442 | B1 * | 12/2019 | Kumar | ................. G11C 13/004 |
| 10,621,267 | B2 | 4/2020 | Strachan et al. | |
| 2017/0228345 | A1 * | 8/2017 | Gupta | ...................... G06G 7/19 |
| 2018/0004708 | A1 * | 1/2018 | Muralimanohar | ...... G06F 17/16 |
| 2021/0173893 | A1 * | 6/2021 | Luo | ...................... G11C 7/1006 |
| 2022/0366004 | A1 * | 11/2022 | Joshi | ......................... G06F 7/02 |

OTHER PUBLICATIONS

R. Cai, A. Ren, Y. Wang and B. Yuan, "Memristor-Based Discrete Fourier Transform for Improving Performance and Energy Efficiency," 2016 IEEE Computer Society Annual Symposium on VLSI (ISVLSI), Pittsburgh, PA, USA, 2016, pp. 643-648, doi: 10.1109/ISVLSI.2016.124. (Year: 2016).*

(Continued)

*Primary Examiner* — Andrew Caldwell
*Assistant Examiner* — Huy Duong
(74) *Attorney, Agent, or Firm* — Barry IP Law, P.C.

(57) ABSTRACT

A non-volatile memory device is configured for in-memory computation of discrete Fourier transformations and their inverses. The real and imaginary components of the twiddle factors are stored as conductance values of memory cells in non-volatile memory arrays having a cross-point structure. The real and imaginary components of inputs are encoded as word line voltages applied to the arrays. Positive and negative valued components of the twiddle factors are stored separately and positive and negative of the inputs are separately applied to the arrays. Real and imaginary parts of the outputs for the discrete Fourier transformation are determined from combinations of the output currents from the arrays.

20 Claims, 19 Drawing Sheets

(56) References Cited

OTHER PUBLICATIONS

Zhao, Han. "Energy-Efficient High-Fidelity Image Reconstruction with Memristor Arrays for Medical Diagnosis." Nature News, Nature Publishing Group, Apr. 20, 2023, www.nature.com/articles/s41467-023-38021-7. (Year: 2023).*

Yantir, Hasan Erdem, et al., "An Ultra-Area-Efficient 1024-Point In-Memory FFT Processor," Micromachines, Jul. 31, 2019, 16 pages.

Demir, Ali Fatih, et al., "Waveform Design for 5G and Beyond," Cornell University, arXiv:1902.05999v1, Feb. 15, 2019, 22 pages.

Hu, Miao, et al., "Accelerating Discrete Fourier Transforms with Dot-product Engine," Hewlett Packard Labaratories, Western Digital, Downloaded on May 1, 2021, 5 pages.

* cited by examiner

Figure 9

COMPUTATION OF DISCRETE FOURIER TRANSFORMATION (DFT) USING NON-VOLATILE MEMORY ARRAYS

BACKGROUND

Discrete Fourier Transformations (DFTs) and Inverse Discrete Fourier Transformations (IDFTs) are important computational techniques that find widespread application in many domains of electronics. For example, in wireless communication networks, DFTs and IDFTs are used to perform orthogonal frequency modulation and demodulation for transmitter and receiver integrated circuits. Other examples include multi-channel spectrum analyzer of signals in multi-frequency bands and the pre-processing (such as analyzing, filtering, and/or compressing) of the data of multi-sensor array. Although widely adopted, discreet Fourier transformations are highly computationally intensive, which can limit their accuracy and use.

BRIEF DESCRIPTION OF THE DRAWING

Like-numbered elements refer to common components in the different figures.

FIG. 9 illustrates an example of a 4-point discreet Fourier transformation mapped onto a memory array.

DETAILED DESCRIPTION

Discrete Fourier transformations are highly useful, but are also highly computationally intensive. The following presents techniques that allow these transformations to be more readily computed by in-memory computation using non-volatile memory arrays.

To perform in-memory computations of discrete Fourier transformations, the real and imaginary parts of the components of an orthogonal basis, or "twiddle factors", used in the computation of discreet Fourier transformations, are stored in memory cells as conductance values. The positive and negative valued components are both stored as non-negative conductance values. The real and imaginary parts of inputs to the discrete Fourier transformation are encoded as voltage values applied to word lines of the array or arrays storing the encoded twiddle factors, generating currents on bit lines corresponding to the real and imaginary parts of the outputs of the discrete Fourier transformation. Both positive and negative values of the inputs are encoded as non-negative voltages, so that the resultant output currents are also non-negative. To account for negative values of both twiddle factors and inputs, the different combinations of (positive input)–(positive twiddle factor), (positive input)–(negative twiddle factor), (negative input)–(positive twiddle factor), and (negative input)–(negative twiddle factor) are determined. The output of the discrete Fourier transformation is then formed by a linear combination of the four in-memory multiplications, with minus signs introduced to account for the negative values. Embodiments include both "flat" implementations, in which all of the components of the twiddle factors are stored in the one or more memory arrays, and "folded" implementations, where the symmetries of the twiddle factors are used to store a sub-set of the twiddle factors and sub-sets of the inputs applied sequentially with the outputs accumulated.

Figure 1:
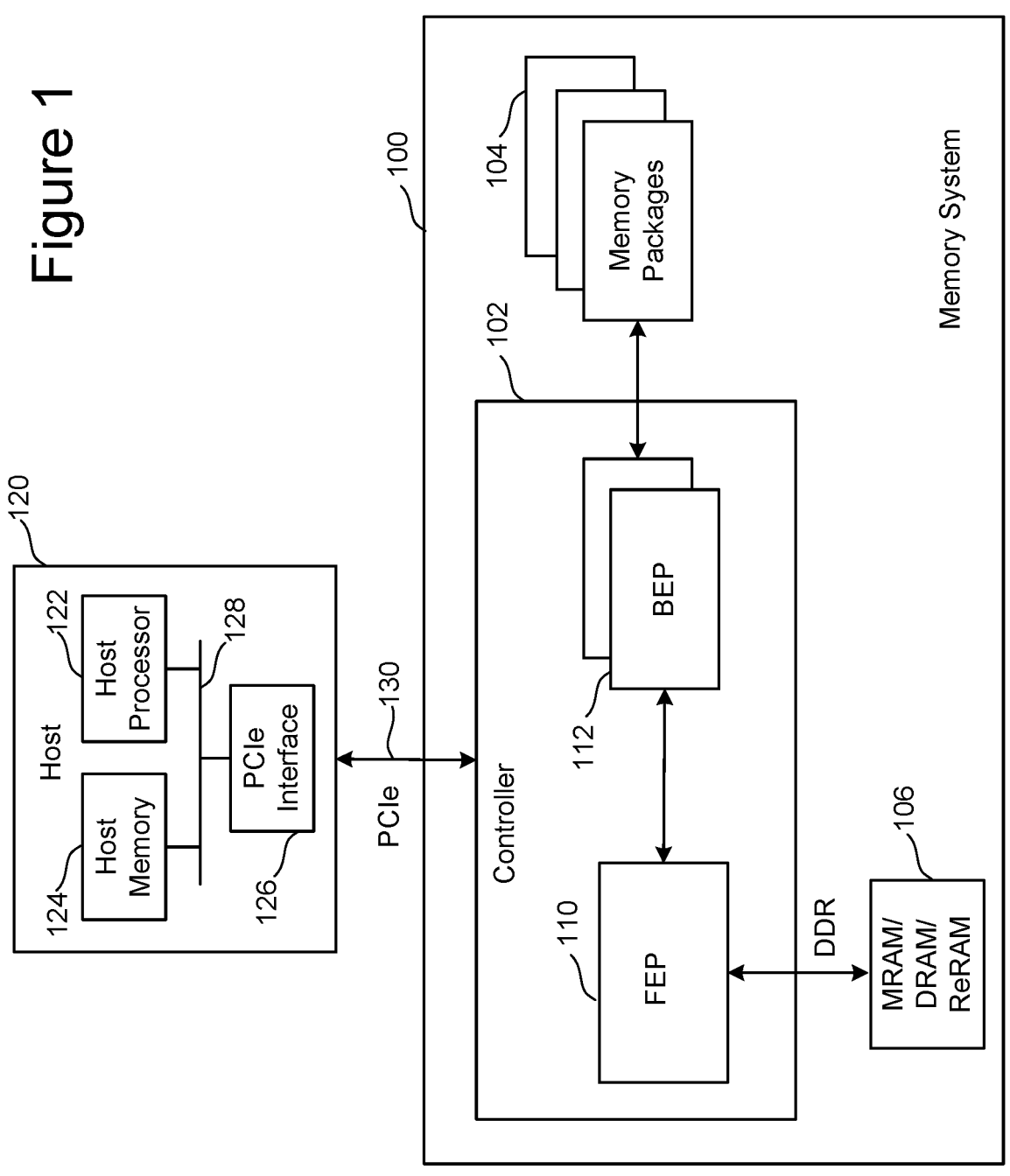
FIG. 1 is a block diagram of one embodiment of a memory system connected to a host.

FIG. 1 is a block diagram of one embodiment of a memory system 100 connected to a host 120. Memory system 100 can implement the technology presented herein for in-memory computation of discrete Fourier transforms. Many different types of memory systems can be used with the technology proposed herein. Example memory systems include solid state drives ("SSDs"), memory cards including dual in-line memories (DIMMs) for DRAM replacement, and embedded memory devices; however, other types of memory systems can also be used.

Memory system 100 of FIG. 1 comprises a controller 102, non-volatile memory 104 for storing data, and local memory (e.g., DRAM/ReRAM) 106. Controller 102 comprises a Front End Processor (FEP) circuit 110 and one or more Back End Processor (BEP) circuits 112. In one embodiment FEP circuit 110 is implemented on an Application Specific Integrated Circuit (ASIC). In one embodiment, each BEP circuit 112 is implemented on a separate ASIC. In other embodiments, a unified controller ASIC can combine both the front end and back end functions. The ASICs for each of the BEP circuits 112 and the FEP circuit 110 are implemented on the same semiconductor such that the controller 102 is manufactured as a System on a Chip ("SoC"). FEP circuit 110 and BEP circuit 112 both include their own processors. In one embodiment, FEP circuit 110 and BEP circuit 112 work as a master slave configuration where the FEP circuit 110 is the master and each BEP circuit 112 is a slave. For example, FEP circuit 110 implements a Flash Translation Layer (FTL) or Media Management Layer (MML) that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory packages/die at the request of FEP circuit 110. For example, the BEP circuit 112 can carry out the read, erase, and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages.

In one embodiment, non-volatile memory 104 comprises a plurality of memory packages. Each memory package includes one or more memory die. Therefore, controller 102 is connected to one or more non-volatile memory die. In one embodiment, each memory die in the memory packages 104 utilize NAND flash memory (including two dimensional NAND flash memory and/or three dimensional NAND flash memory). In other embodiments, the memory package can include other types of memory, such as storage class memory (SCM) based on resistive random access memory (such as ReRAM, MRAM, FeRAM or RRAM) or a phase change memory (PCM). In another embodiment, the BEP or FEP is included on the memory die.

Controller 102 communicates with host 120 via an interface 130 that implements a protocol such as, for example, NVM Express (NVMe) over PCI Express (PCIe) or using JEDEC standard Double Data Rate (DDR) or Low-Power Double Data Rate (LPDDR) interface such as DDR5 or LPDDR5. For working with memory system 100, host 120 includes a host processor 122, host memory 124, and a PCIe interface 126 connected along bus 128. Host memory 124 is the host's physical memory, and can be DRAM, SRAM, non-volatile memory, or another type of storage. Host 120 is external to and separate from memory system 100. In one embodiment, memory system 100 is embedded in host 120.

Figure 2:
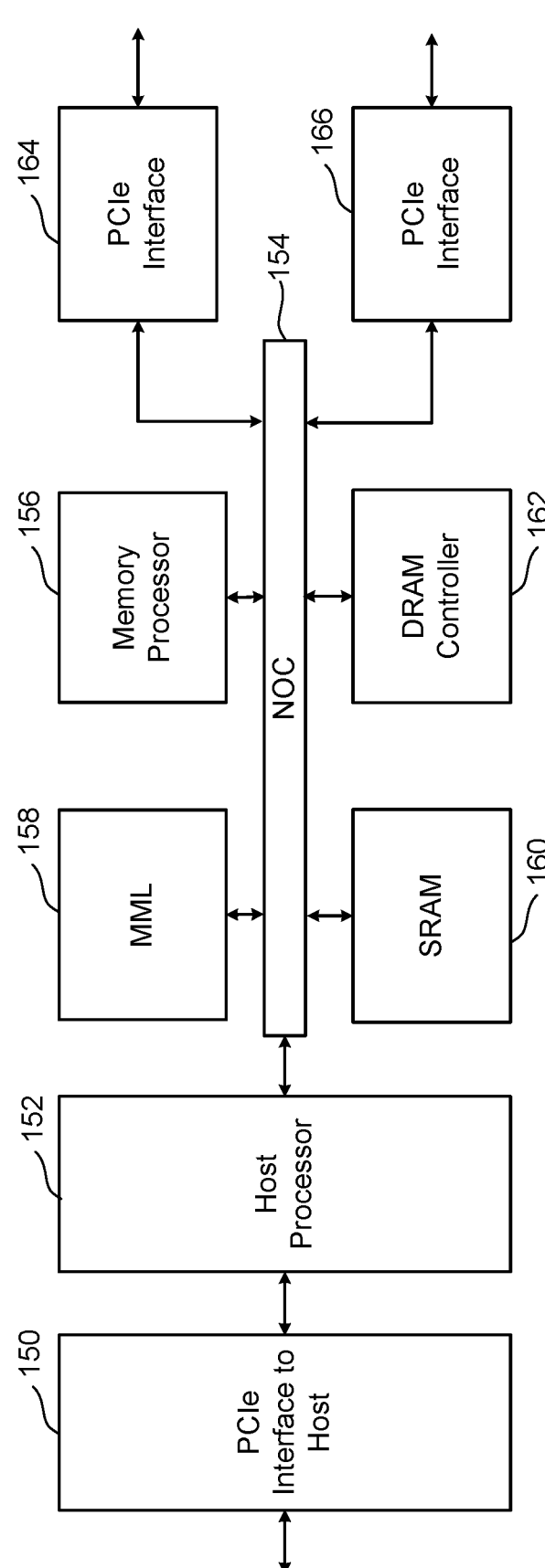
FIG. 2 is a block diagram of one embodiment of a Front End Processor Circuit. In some embodiments, the Front End Processor Circuit is part of a Controller.

FIG. 2 is a block diagram of one embodiment of FEP circuit 110. FIG. 2 shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOCs can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also, in communication with the NOC are two PCIe Interfaces 164 and 166. In the embodiment of FIG. 2, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

FEP circuit 110 can also include a Flash Translation Layer (FTL) or, more generally, a Media Management Layer (MML) 158 that performs memory management (e.g., garbage collection, wear leveling, load balancing, etc.), logical to physical address translation, communication with the host, management of DRAM (local volatile memory) and management of the overall operation of the SSD or other non-volatile storage system. The media management layer MML 158 may be integrated as part of the memory management that may handle memory errors and interfacing with the host. In particular, MML may be a module in the FEP circuit 110 and may be responsible for the internals of memory management. In particular, the MML 158 may include an algorithm in the memory device firmware which translates writes from the host into writes to the memory structure (e.g., 502/602 of FIGS. 5 and 6 below) of a die. The MML 158 may be needed because: 1) the memory may have limited endurance; 2) the memory structure may only be written in multiples of pages; and/or 3) the memory structure may not be written unless it is erased as a block. The MML 158 understands these potential limitations of the memory structure which may not be visible to the host. Accordingly, the MML 158 attempts to translate the writes from host into writes into the memory structure.

Figure 3:
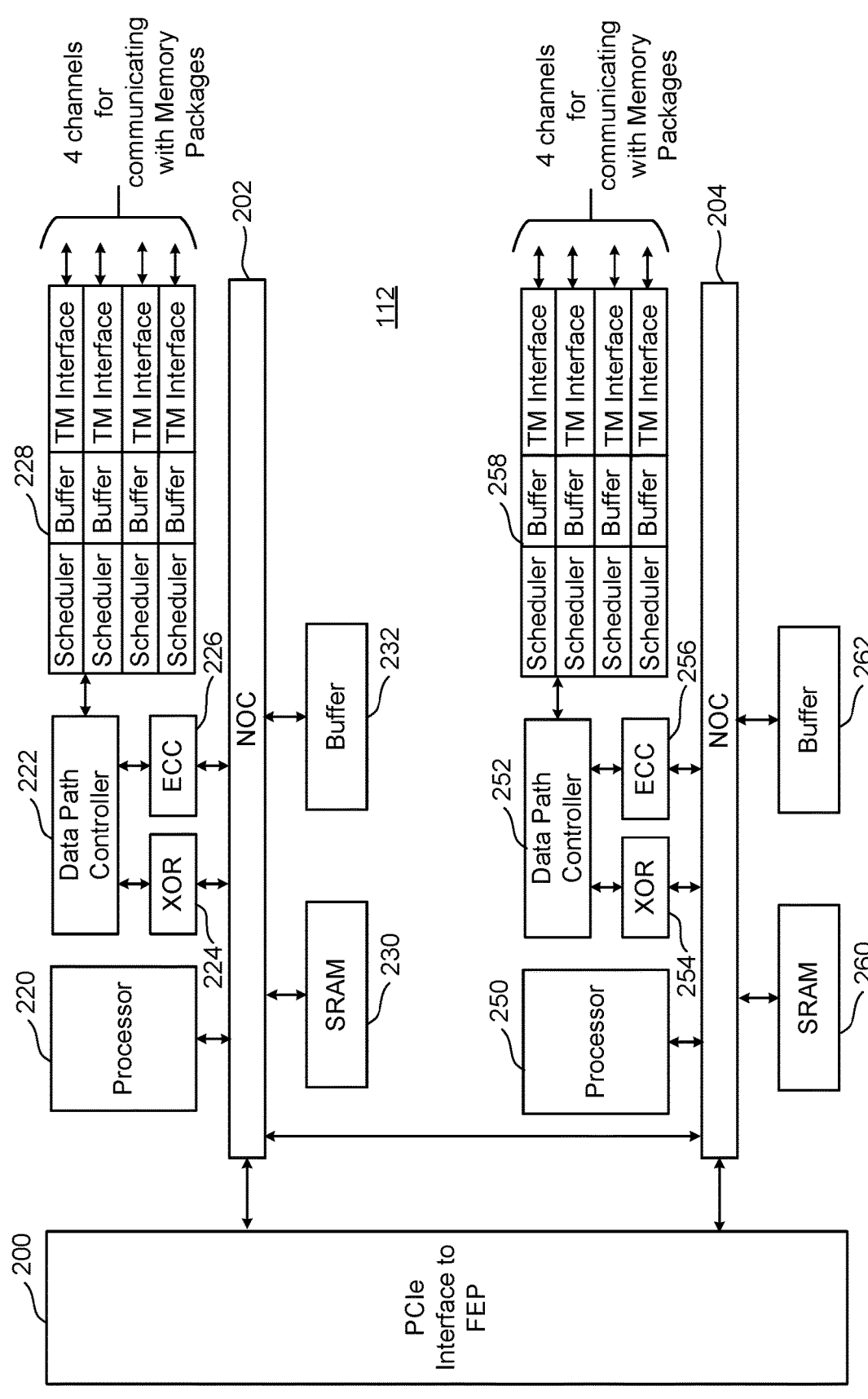
FIG. 3 is a block diagram of one embodiment of a Back End Processor Circuit. In some embodiments, the Back End Processor Circuit is part of a Controller.

FIG. 3 is a block diagram of one embodiment of the BEP circuit 112. FIG. 3 shows a PCIe Interface 200 for communicating with the FEP circuit 110 (e.g., communicating with one of PCIe Interfaces 164 and 166 of FIG. 2). PCIe Interface 200 is in communication with two NOCs 202 and 204. In one embodiment the two NOCs can be combined into one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. Data path controller 222 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer, and TM Interface for each of the channels. The processor can be any standard processor known in the art. The data path controllers 222/252 can be a processor, FPGA, microprocessor, or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

Figure 4:
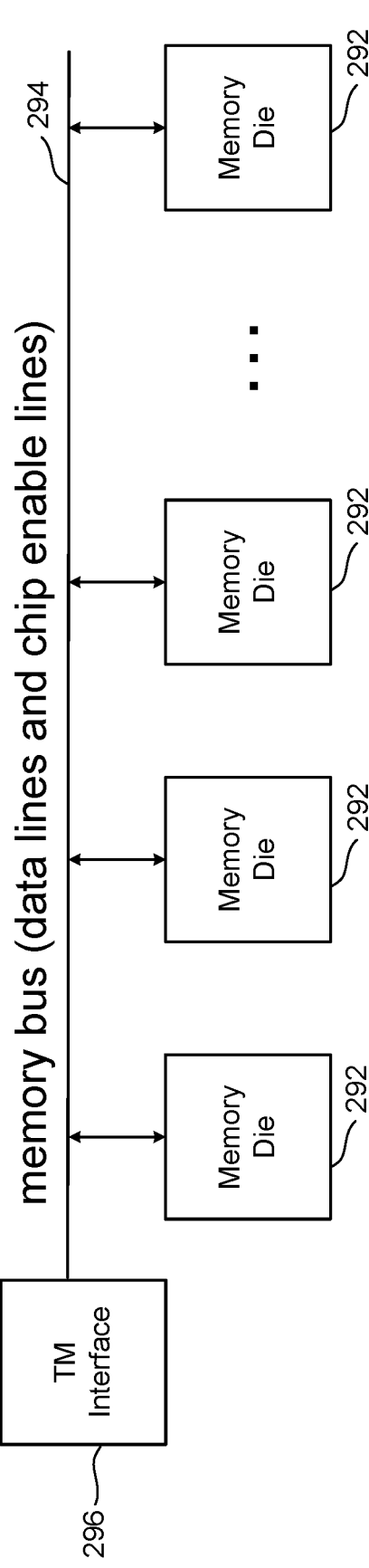
FIG. 4 is a block diagram of one embodiment of a memory package.

FIG. 4 is a block diagram of one embodiment of a memory package 104 that includes a plurality of memory die 292 connected to a memory bus (data lines and chip enable lines) 294. The memory bus 294 connects to a Toggle Mode Interface 296 for communicating with the TM Interface of a BEP circuit 112 (see e.g., FIG. 3). In some embodiments, the memory package can include a small controller connected to the memory bus and the TM Interface. The memory package can have one or more memory die. In one embodiment, each memory package includes eight or 16 memory die; however, other numbers of memory die can also be implemented. In another embodiment, the Toggle Interface is instead JEDEC standard DDR or LPDDR with or without variations such as relaxed time-sets or smaller page size. The technology described herein is not limited to any particular number of memory die.

Figure 5:
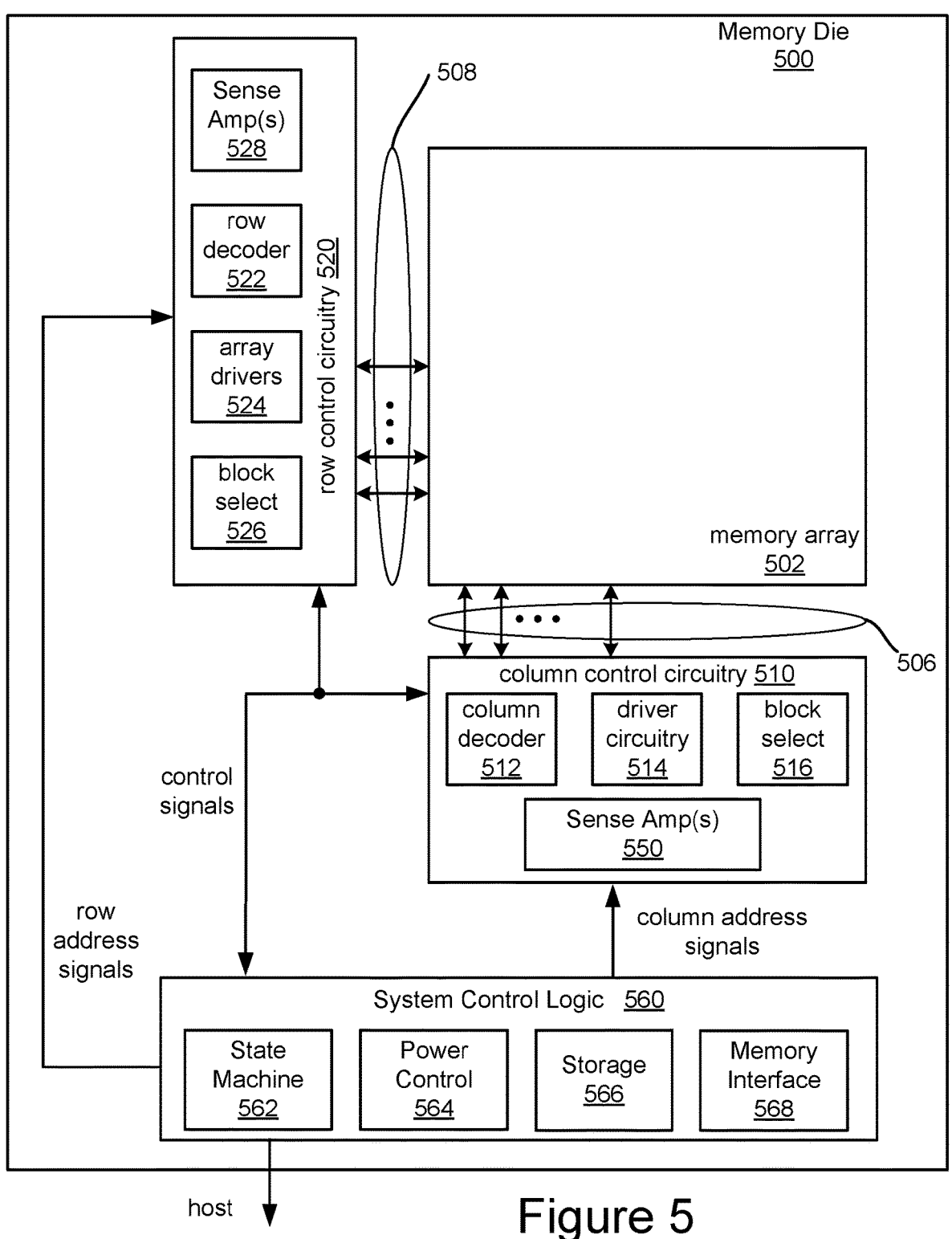
FIG. 5 is a block diagram of one embodiment of a memory die.

FIG. 5 is a block diagram that depicts one example of a memory die 500 that can implement the technology described herein. Memory die 500, which can correspond to one of the memory die 292 of FIG. 4, includes a memory array 502 that can include any of memory cells described in the following. The array terminal lines of memory array 502 include the various layer(s) of word lines organized as rows, and the various layer(s) of bit lines organized as columns. However, other orientations can also be implemented. Memory die 500 includes row control circuitry 520, whose outputs 508 are connected to respective word lines of the memory array 502. Row control circuitry 520 receives a group of M row address signals and one or more various control signals from System Control Logic circuit 560, and typically may include such circuits as row decoders 522, array terminal drivers 524, and block select circuitry 526 for both reading and writing operations. Row control circuitry 520 may also include read/write circuitry. In an embodiment, row control circuitry 520 has sense amplifiers 528, which each contain circuitry for sensing a condition (e.g., voltage) of a word line of the memory array 502. In an embodiment, by sensing a word line voltage, a condition of a memory cell in a cross-point array is determined. Memory die 500 also includes column control circuitry 510 whose input/outputs 506 are connected to respective bit lines of the memory array 502. Although only single block is shown for array 502, a memory die can include multiple arrays or "tiles" that can be individually accessed. Column control circuitry 510 receives a group of N column address signals and one or more various control signals from System Control Logic 560, and typically may include such circuits as column decoders 512, array terminal receivers or drivers 514, block select circuitry 516, as well as read/write circuitry, and I/O multiplexers.

System control logic 560 receives data and commands from a host and provides output data and status to the host. In other embodiments, system control logic 560 receives data and commands from a separate controller circuit and provides output data to that controller circuit, with the controller circuit communicating with the host. In some embodiments, the system control logic 560 can include a state machine 562 that provides die-level control of memory operations. In one embodiment, the state machine 562 is programmable by software. In other embodiments, the state machine 562 does not use software and is completely implemented in hardware (e.g., electrical circuits). In another embodiment, the state machine 562 is replaced by a micro-controller or microprocessor, either on or off the memory chip. The system control logic 560 can also include a power control module 564 controls the power and voltages supplied to the rows and columns of the memory 502 during memory operations and may include charge pumps and regulator circuit for creating regulating voltages. System control logic 560 includes storage 566, which may be used to store parameters for operating the memory array 502.

Commands and data are transferred between the controller 102 and the memory die 500 via memory controller interface 568 (also referred to as a "communication interface"). Memory controller interface 568 is an electrical interface for communicating with memory controller 102. Examples of memory controller interface 568 include a Toggle Mode Interface and an Open NAND Flash Interface (ONFI). Other I/O interfaces can also be used. For example, memory controller interface 568 may implement a Toggle Mode Interface that connects to the Toggle Mode interfaces of memory interface 228/258 for memory controller 102. In one embodiment, memory controller interface 568 includes a set of input and/or output (I/O) pins that connect to the controller 102.

In some embodiments, all of the elements of memory die 500, including the system control logic 560, can be formed as part of a single die. In other embodiments, some or all of the system control logic 560 can be formed on a different die.

For purposes of this document, the phrase "one or more control circuits" can include a controller, a state machine, a micro-controller and/or other control circuitry as represented by the system control logic 560, or other analogous circuits that are used to control non-volatile memory.

In one embodiment, memory structure 502 comprises a three dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping.

In another embodiment, memory structure 502 comprises a two dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 502 is not limited to the examples above. Many different types of memory array architectures or memory technologies can be used to form memory structure 326. No particular non-volatile memory technology is required for purposes of the new claimed embodiments proposed herein. Other examples of suitable technologies for memory cells of the memory structure 502 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 502 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage, light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 5 can be grouped into two parts, the structure of memory structure 502 of the memory cells and the peripheral circuitry, including all of the other elements. An important characteristic of a memory circuit is its capacity, which can be increased by increasing the area of the memory die of memory system 500 that is given over to the memory structure 502; however, this reduces the area of the memory die available for the peripheral circuitry. This can place quite severe restrictions on these peripheral elements. For example, the need to fit sense amplifier circuits within the available area can be a significant restriction on sense amplifier design architectures. With respect to the system control logic 560, reduced availability of area can limit the available functionalities that can be implemented on-chip. Consequently, a basic trade-off in the design of a memory die for the memory system 500 is the amount of area to devote to the memory structure 502 and the amount of area to devote to the peripheral circuitry.

Another area in which the memory structure 502 and the peripheral circuitry are often at odds is in the processing involved in forming these regions, since these regions often involve differing processing technologies and the trade-off in having differing technologies on a single die. For example, when the memory structure 502 is NAND flash, this is an NMOS structure, while the peripheral circuitry is often CMOS based. For example, elements such sense amplifier circuits, charge pumps, logic elements in a state machine, and other peripheral circuitry in system control logic 560 often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 5 onto separately formed dies that are then bonded together. More specifically, the memory structure 502 can be formed on one die and some or all of the peripheral circuitry elements, including one or more control circuits, can be formed on a separate die. For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate die. This allows each of the memory die to be optimized individually according to its technology. For example, a NAND memory die can be optimized for an NMOS based memory array structure, without worrying about the CMOS elements that have now been moved onto a separate peripheral circuitry die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other memory circuit. Although the following will focus on a bonded memory circuit of one memory die and one peripheral circuitry die, other embodiments can use more die, such as two memory die and one peripheral circuitry die, for example.

Figure 6A:
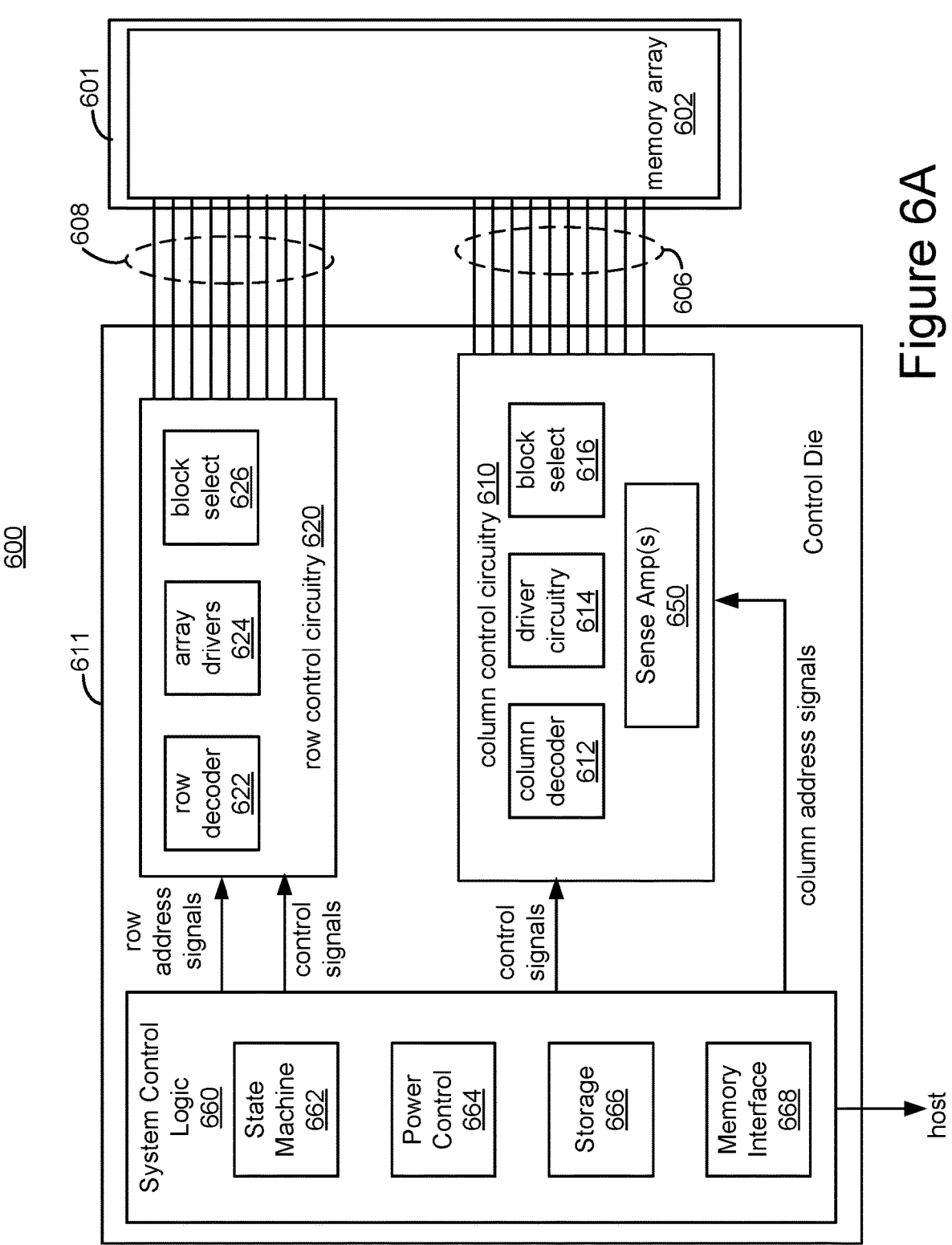
FIGS. 6A and 6B illustrate an example of control circuits coupled to a memory structure through wafer-to-wafer bonding.
Figure 6B:
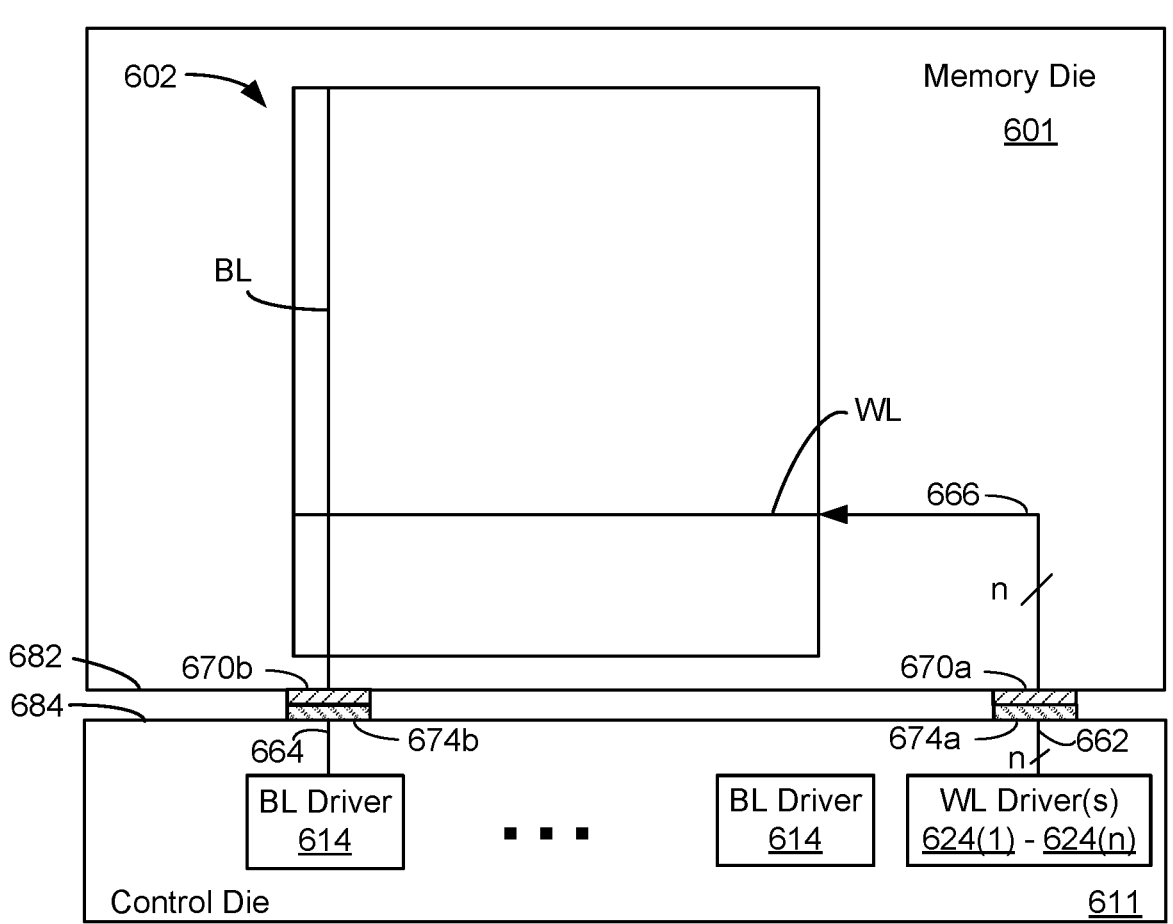

FIGS. 6A and 6B show an alternative arrangement to that of FIG. 5, which may be implemented using wafer-to-wafer bonding to provide a bonded die pair for memory system 600. FIG. 6A shows an example of the peripheral circuitry, including control circuits, formed in a peripheral circuit or control die 611 coupled to memory structure 602 formed in memory die 601. As with 502 of FIG. 5, the memory die 601 can include multiple independently accessible arrays or "tiles". Common components are labelled similarly to FIG. 5 (e.g., 502 is now 602, 510 is now 610, and so on). It can be seen that system control logic 660, row control circuitry 620, and column control circuitry 610 are located in control die 611. In some embodiments, all or a portion of the column control circuitry 610 and all or a portion of the row control circuitry 620 are located on the memory structure die 601. In some embodiments, some of the circuitry in the system control logic 660 is located on the on the memory structure die 601.

System control logic 660, row control circuitry 620, and column control circuitry 610 may be formed by a common process (e.g., CMOS process), so that adding elements and functionalities, such as ECC, more typically found on a memory controller 102 may require few or no additional process steps (i.e., the same process steps used to fabricate controller 102 may also be used to fabricate system control logic 660, row control circuitry 620, and column control circuitry 610). Thus, while moving such circuits from a die such as memory die 292 may reduce the number of steps needed to fabricate such a die, adding such circuits to a die such as control die 611 may not require any additional process steps.

FIG. 6A shows column control circuitry 610 on the control die 611 coupled to memory structure 602 on the memory structure die 601 through electrical paths 606. For example, electrical paths 606 may provide electrical connection between column decoder 612, driver circuitry 614, and block select 616 and bit lines of memory structure 602. Electrical paths may extend from column control circuitry 610 in control die 611 through pads on control die 611 that are bonded to corresponding pads of the memory structure die 601, which are connected to bit lines of memory structure 602. Each bit line of memory structure 602 may have a corresponding electrical path in electrical paths 606, including a pair of bond pads, which connects to column control circuitry 610. Similarly, row control circuitry 620, including row decoder 622, array drivers 624, block select 626, and sense amplifiers 628 are coupled to memory structure 602 through electrical paths 608. Each of electrical path 608 may correspond to a word line, dummy word line, or select gate line. Additional electrical paths may also be provided between control die 611 and memory die 601.

For purposes of this document, the phrase "control circuit" can include one or more of controller 102, system control logic 660, column control circuitry 610, row control circuitry 620, a micro-controller, a state machine, and/or other control circuitry, or other analogous circuits that are used to control non-volatile memory. The control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

FIG. 6B is a block diagram showing more detail on the arrangement of one embodiment of the integrated memory assembly of bonded die pair 600. Memory die 601 contains a plane or array 602 of memory cells. The memory die 601 may have additional planes or arrays. One representative bit line (BL) and representative word line (WL) 666 is depicted for each plane or array 602. There may be thousands or tens of thousands of such bit lines per each plane or array 602. In one embodiment, an array or plane represents a groups of connected memory cells that share a common set of unbroken word lines and unbroken bit lines.

Control die 611 includes a number of bit line drivers 614. Each bit line driver 614 is connected to one bit line or may be connected to multiple bit lines in some embodiments. The control die 611 includes a number of word line drivers 624(1)-624(n). The word line drivers 624(1)-624(n) are configured to provide voltages to word lines. In this example, there are "n" word lines per array or plane memory cells. If the memory operation is a program or read, one word line within the selected block is selected for the memory operation, in one embodiment. If the memory operation is an erase, all of the word lines within the selected block are selected for the erase, in one embodiment. The word line drivers 624 provide voltages to the word lines in memory die 601. As discussed above with respect to FIG.

6A, the control die 611 may also include charge pumps, voltage generators, and the like that are not represented in FIG. 6B, which may be used to provide voltages for the word line drivers 624 and/or the bit line drivers 614.

The memory die 601 has a number of bond pads 670a, 670b on a first major surface 682 of memory die 601. There may be "n" bond pads 670a, to receive voltages from a corresponding "n" word line drivers 624(1)-624(n). There may be one bond pad 670b for each bit line associated with array 602. The reference numeral 670 will be used to refer in general to bond pads on major surface 682.

In some embodiments, each data bit and each parity bit of a codeword are transferred through a different bond pad pair 670b, 674b. The bits of the codeword may be transferred in parallel over the bond pad pairs 670b, 674b. This provides for a very efficient data transfer relative to, for example, transferring data between the memory controller 102 and the integrated memory assembly 600. For example, the data bus between the memory controller 102 and the integrated memory assembly 600 may, for example, provide for eight, sixteen, or perhaps 32 bits to be transferred in parallel. However, the data bus between the memory controller 102 and the integrated memory assembly 600 is not limited to these examples.

The control die 611 has a number of bond pads 674a, 674b on a first major surface 684 of control die 611. There may be "n" bond pads 674a, to deliver voltages from a corresponding "n" word line drivers 624(1)-624(n) to memory die 601. There may be one bond pad 674b for each bit line associated with array 602. The reference numeral 674 will be used to refer in general to bond pads on major surface 682. Note that there may be bond pad pairs 670a/674a and bond pad pairs 670b/674b. In some embodiments, bond pads 670 and/or 674 are flip-chip bond pads.

In one embodiment, the pattern of bond pads 670 matches the pattern of bond pads 674. Bond pads 670 are bonded (e.g., flip chip bonded) to bond pads 674. Thus, the bond pads 670, 674 electrically and physically couple the memory die 601 to the control die 611. Also, the bond pads 670, 674 permit internal signal transfer between the memory die 601 and the control die 611. Thus, the memory die 601 and the control die 611 are bonded together with bond pads. Although FIG. 6A depicts one control die 611 bonded to one memory die 601, in another embodiment one control die 611 is bonded to multiple memory dies 601.

Herein, "internal signal transfer" means signal transfer between the control die 611 and the memory die 601. The internal signal transfer permits the circuitry on the control die 611 to control memory operations in the memory die 601. Therefore, the bond pads 670, 674 may be used for memory operation signal transfer. Herein, "memory operation signal transfer" refers to any signals that pertain to a memory operation in a memory die 601. A memory operation signal transfer could include, but is not limited to, providing a voltage, providing a current, receiving a voltage, receiving a current, sensing a voltage, and/or sensing a current.

The bond pads 670, 674 may be formed for example of copper, aluminum, and alloys thereof. There may be a liner between the bond pads 670, 674 and the major surfaces (682, 684). The liner may be formed for example of a titanium/titanium nitride stack. The bond pads 670, 674 and liner may be applied by vapor deposition and/or plating techniques. The bond pads and liners together may have a thickness of 720 nm, though this thickness may be larger or smaller in further embodiments.

Metal interconnects and/or vias may be used to electrically connect various elements in the dies to the bond pads 670, 674. Several conductive pathways, which may be implemented with metal interconnects and/or vias are depicted. For example, a sense amplifier may be electrically connected to bond pad 674b by pathway 664. Relative to FIG. 6A, the electrical paths 606 can correspond to pathway 664, bond pads 674b, and bond pads 670b. There may be thousands of such sense amplifiers, pathways, and bond pads. Note that the BL does not necessarily make direct connection to bond pad 670b. The word line drivers 660 may be electrically connected to bond pads 674a by pathways 662. Relative to FIG. 6A, the electrical paths 608 can correspond to the pathway 662, the bond pads 674a, and bond pads 670a. Note that pathways 662 may comprise a separate conductive pathway for each word line driver 624(1)-624(n). Likewise, a there may be a separate bond pad 674a for each word line driver 624(1)-624(n). The word lines in block 2 of the memory die 601 may be electrically connected to bond pads 670a by pathways 664. In FIG. 6B, there are "n" pathways 664, for a corresponding "n" word lines in a block. There may be separate pair of bond pads 670a, 674a for each pathway 664.

Relative to FIG. 5, the on-die control circuits of FIG. 6A can also include addition functionalities within its logic elements, both more general capabilities than are typically found in the memory controller 102 and some CPU capabilities, but also application specific features.

In the following, system control logic 560/660, column control circuitry 510/610, row control circuitry 520/620, and/or controller 102 (or equivalently functioned circuits), in combination with all or a subset of the other circuits depicted in FIG. 5 or on the control die 611 in FIG. 6A and similar elements in FIG. 5, can be considered part of the one or more control circuits that perform the functions described herein. The control circuits can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

In the following discussion, the memory array 502/602 of FIGS. 5 and 6A will mainly be discussed in the context of a cross-point architecture, although much of the discussion can be applied more generally. In a cross-point architecture, a first set of conductive lines or wires, such as word lines, run in a first direction relative to the underlying substrate and a second set of conductive lines or wires, such a bit lines, run in a second direction relative to the underlying substrate. The memory cells are situated at the intersection of the word lines and bit lines. The memory cells at these cross-points can be formed according to any of a number of technologies, including those described above. The following discussion will mainly focus on embodiments based on a cross-point architecture using MRAM memory cells.

Figure 7A:
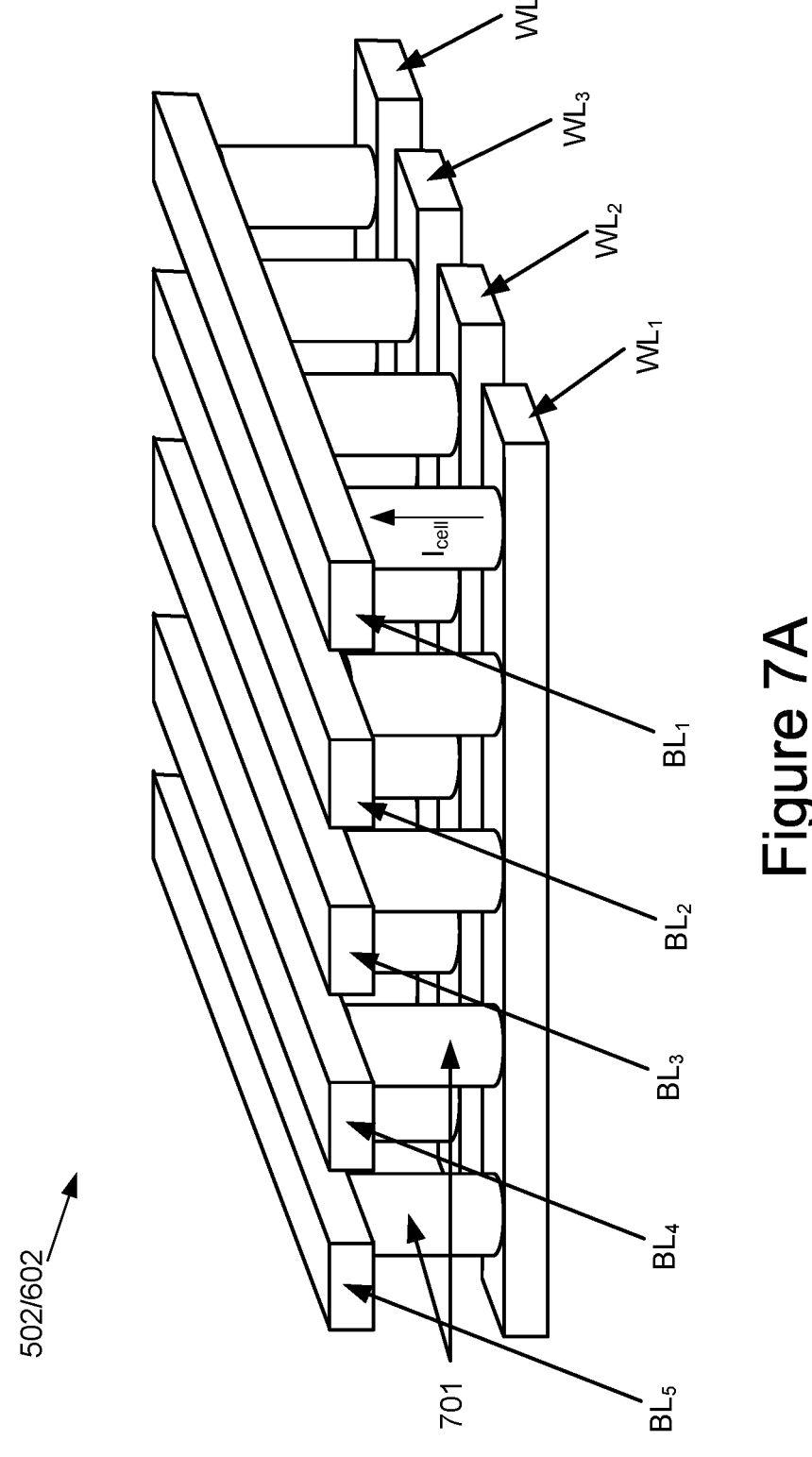
FIG. 7A depicts one embodiment of a portion of a memory array that forms a cross-point architecture in an oblique view.

FIG. 7A depicts one embodiment of a portion of a memory array that forms a cross-point architecture in an oblique view. Memory array 502/602 of FIG. 7A is one example of an implementation for memory array 502 in FIG. 5 or 602 in FIG. 6A, where a memory die can include multiple such array structures. The bit lines $BL_1$-$BL_5$ are arranged in a first direction (represented as running into the page) relative to an underlying substrate (not shown) of the die and the word lines $WL_1$-$WL_5$ are arranged in a second direction perpendicular to the first direction. FIG. 7A is an example of a horizontal cross-point structure in which word lines $WL_1$-$WL_5$ and $BL_1$-$BL_5$ both run in a horizontal direction relative to the substrate, while the memory cells, two of which are indicated at 701, are oriented so that the current through a memory cell (such as shown at $I_{cell}$) runs in the vertical direction. In a memory array with additional layers of memory cells, such as discussed below with respect to FIG. 7D, there would be corresponding additional layers of bit lines and word lines.

As depicted in FIG. 7A, memory array 502/602 includes a plurality of memory cells 701. The memory cells 701 may include re-writeable memory cells, such as can be implemented using ReRAM, MRAM, PCM, or other material with a programmable resistance. The following discussion will focus on MRAM memory cells, although much of the discussion can be applied more generally. The current in the memory cells of the first memory level is shown as flowing upward as indicated by arrow $I_{cell}$, but current can flow in either direction, as is discussed in more detail in the following.

Figure 7B:
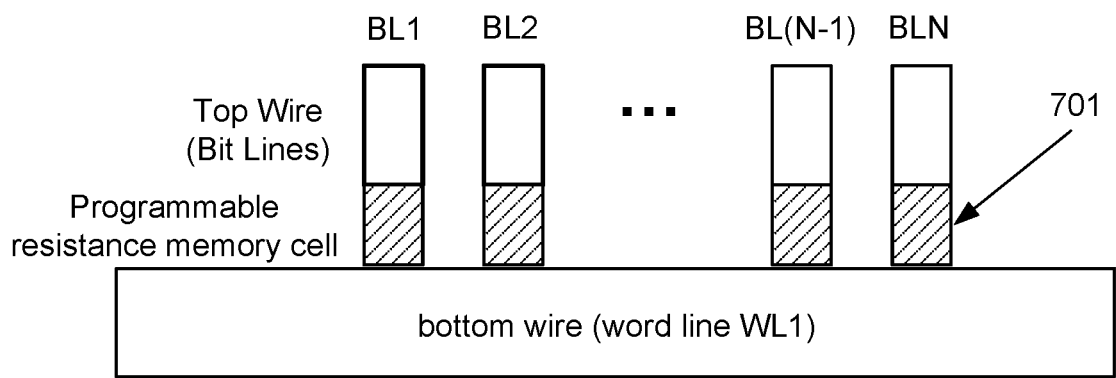
FIGS. 7B and 7C respectively present side and top views of the cross-point structure in FIG. 7A.
Figure 7C:
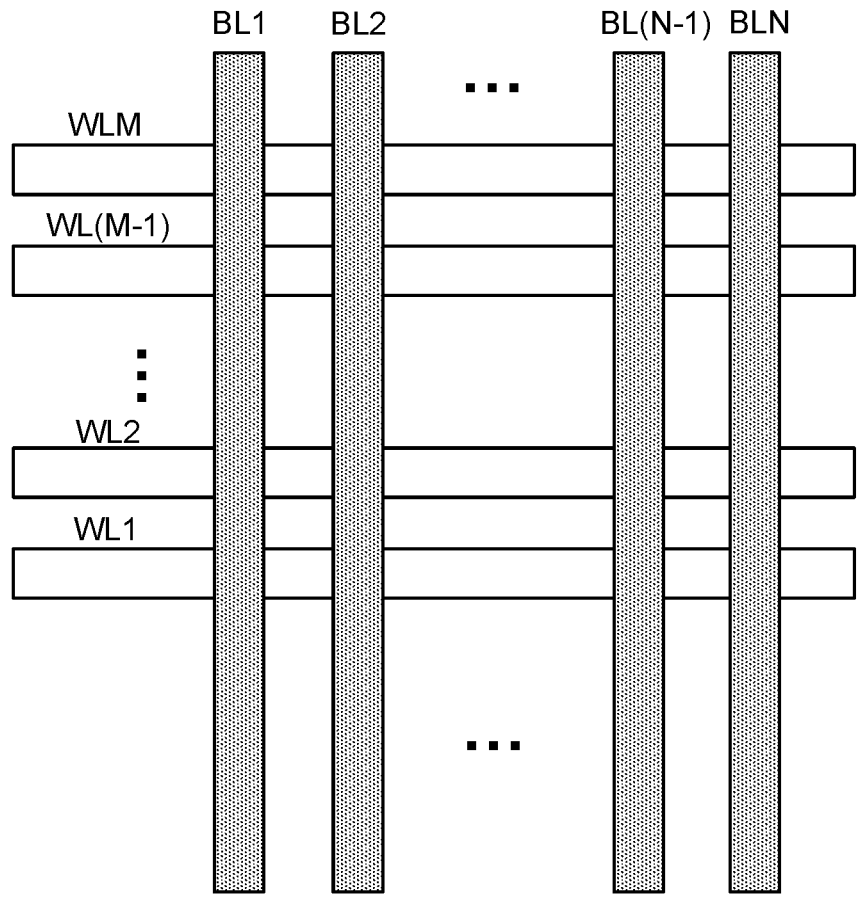

FIGS. 7B and 7C respectively present side and top views of the cross-point structure in FIG. 7A. The sideview of FIG. 7B shows one bottom wire, or word line, $WL_1$ and the top wires, or bit lines, $BL_1$-$BL_n$. At the cross-point between each top wire and bottom wire is an MRAM memory cell 701, although PCM, ReRAM, or other technologies can be used. FIG. 7C is a top view illustrating the cross-point structure for M bottom wires $WL_1$-$WL_M$ and N top wires $BL_1$-$BL_N$. The MRAM cell at each cross-point can be programmed into one of at least two resistance states: high and low. More detail on embodiments for an MRAM memory cell design and techniques for their programming are given below.

The cross-point array of FIG. 7A illustrates an embodiment with one layer of word lines and bits lines, with the MRAM or other memory cells sited at the intersection of the two sets of conducting lines. To increase the storage density of a memory die, multiple layers of such memory cells and conductive lines can be formed. A 2-layer example is illustrated in FIG. 7D.

Figure 7D:
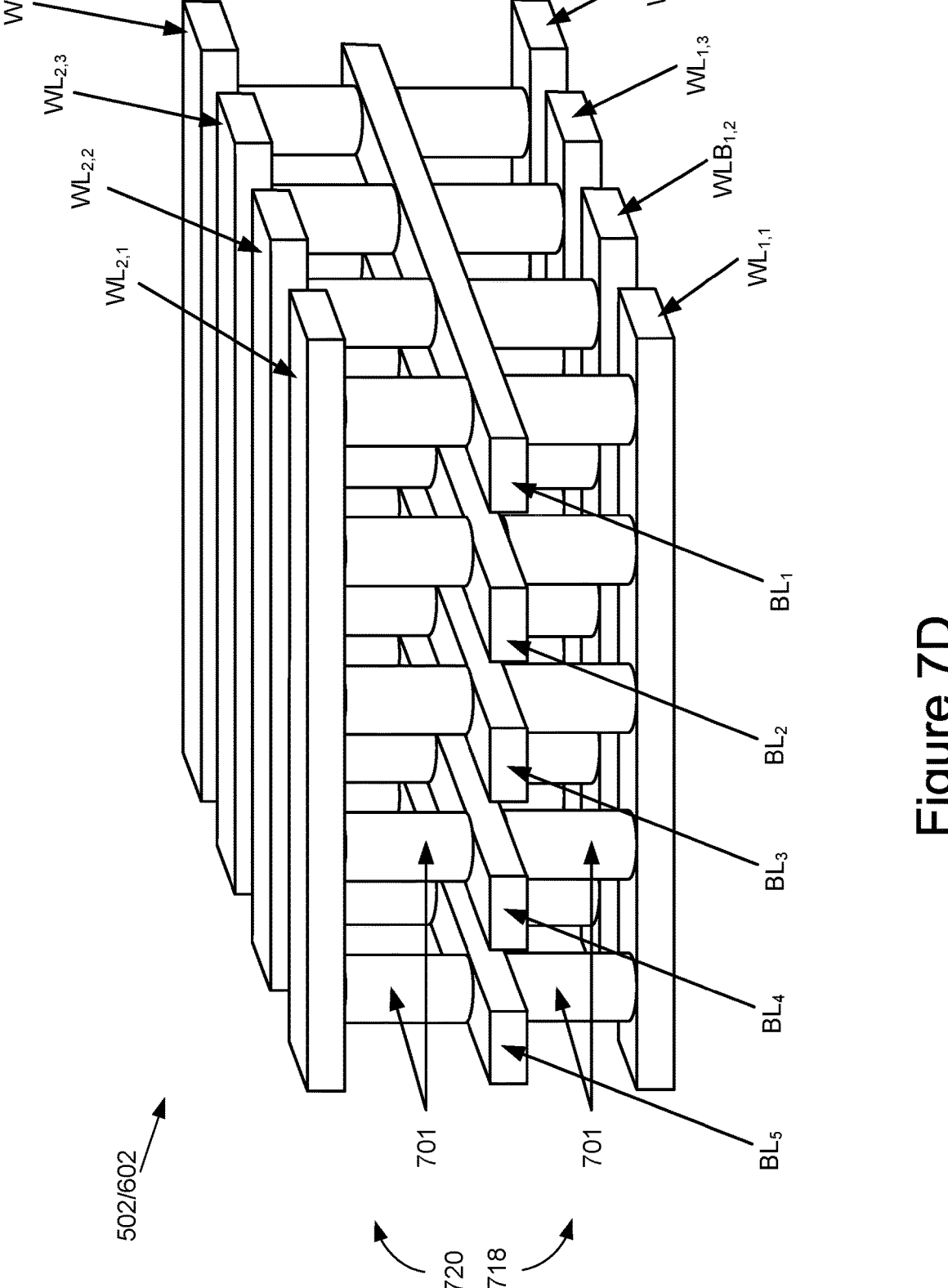
FIG. 7D depicts an embodiment of a portion of a two level memory array that forms a cross-point architecture in an oblique view.

FIG. 7D depicts an embodiment of a portion of a two level memory array that forms a cross-point architecture in an oblique view. As in FIG. 7A, FIG. 7D shows a first layer 718 of memory cells 701 of an array 502/602 connected at the cross-points of the first layer of word lines $WL_{1,1}$-$WL_{1,4}$ and bit lines $BL_1$-$BL_5$. A second layer of memory cells 720 is formed above the bit lines $BL_1$-$BL_5$ and between these bit lines and a second set of word lines $WL_{2,1}$-$WL_{2,4}$. Although FIG. 7D shows two layers, 718 and 720, of memory cells, the structure can be extended upward through additional alternating layers of word lines and bit lines. Depending on the embodiment, the word lines and bit lines of the array of FIG. 7D can be biased for read or program operations such that current in each layer flows from the word line layer to the bit line layer or the other way around. The two layers can be structured to have current flow in the same direction in each layer for a given operation or to have current flow in the opposite directions.

The use of a cross-point architecture allows for arrays with a small footprint and several such arrays can be formed on a single die. The memory cells formed at each cross-point can a resistive type of memory cell, where data values are encoded as different resistance levels. Depending on the embodiment, the memory cells can be binary valued, having either a low resistance state or a high resistance state, or multi-level cells (MLCs) that can have additional resistance intermediate to the low resistance state and high resistance state. The cross-point arrays described here can be used as the memory die 292 of FIG. 4, to replace local memory 106, or both. Resistive type memory cells can be formed according to many of the technologies mentioned above, such as ReRAM, FeRAM, PCM, or MRAM. When reference is made to particular technology, the following discussion is presented mainly in the context of memory arrays using a cross-point architecture with MRAM memory cells, although much of the discussion is more generally applicable to other non-volatile memory resistive memory arrays.

Turning now to types of data that can be stored in non-volatile memory devices, a particular example of the type of data of interest in the following discussion is the collection of the components of an orthogonal basis, or "twiddle factors", used in the computation of discreet Fourier transformations. Discreet Fourier Transformations (DFTs) and their inverses (IDFTs) are discrete transformations used to perform Fourier analysis in a wide variety of practical applications. For example, in digital signal processing, the transformations can be applied to any quantity or signal that varies over time, such as the pressure of a sound wave, a radio signal, or daily temperature readings that are sampled over a finite time interval. In image processing, the samples can be the values of pixels along a row or column of a raster image. The DFT can be also used to efficiently solve partial differential equations and to perform other operations such as convolutions or multiplying large integers. Specific example of technologies where such transformation are used include wireless communication networks in which they are used in for orthogonal frequency division multiplexing, multi-channel spectrum analysis where they are used to analyze a signal in multiple frequency bands, and pre-processing the data of multi-sensor arrays where they and used for operations such as analyzing, filtering, and compressing data.

Although discrete Fourier transformations are highly useful, they are also highly computationally intensive. The following presents techniques that allows these transformations to be more readily computed by in-memory computation using non-volatile memory arrays, such as the embodiments described above.

An N-point one-dimension Discrete Fourier Transformation (DSF), often called a forward discrete Fourier transform to distinguish it from the inverse transformation, is given by:

$$Y_k = \sum_{n=0}^{N-1} X_n e^{\frac{-j2\pi kn}{N}}, \qquad \text{eq. (1)}$$

where the exponents $$W_{n,k} = e^{\frac{-j2\pi kn}{N}}$$

are based on the N roots of unity and form an orthogonal basis for expanding the N dimensional complex output vector $Y_k$ and in terms of the N dimensional complex input vector $X_n$. The inverse discrete Fourier transformation (IDSF) is given by:

$$X_n = \sum_{k=0}^{N-1} Y_k e^{\frac{+j2\pi kn}{N}}. \qquad \text{eq. (2)}$$

Although not included in the above two equations, in order to allow the combined application of a Fourier transformation followed by its inverse to return the original input, a normalization factor of 1/N is needed. There are various conventions on where and when this normalization factor is introduced. For example, in some cases the inversion is defined as 1/N equation (2) and in other cases the factor is split (as a square root) between equations (1) and (2).

The exponents $W_{n,k}$ of the orthogonal basis, commonly known as twiddle factors, can be decomposed into their real and imaginary component parts as:

$$W_{n,k} = e^{\frac{-j2\pi kn}{N}} = \cos\left(\frac{-2k\pi n}{N}\right) + j\sin\left(\frac{-2k\pi n}{N}\right). \qquad \text{eq. (3)}$$

Breaking down the input and output vectors as well as the components orthogonal basis values into their real and imaginary parts allows for a decomposition of the discrete Fourier transformation into real and imaginary parts, giving:

$$Y_k^R = \sum_{n=0}^{N-1} X_n^R W_{n,k}^R - X_n^I W_{n,k}^I, \qquad \text{eq. (4)}$$

$$Y_k^I = \sum_{n=0}^{N-1} X_n^R W_{n,k}^I - X_n^I W_{n,k}^R, \qquad \text{eq. (5)}$$

where $$Y_k^R \text{ and } Y_k^I$$

are respectively the real and the imaginary part of the output $$Y_k, X_n^R \text{ and } X_n^I$$

are respectively the real and the imaginary part of the input $$X_n, \text{ and } W_{n,k}^R \text{ and } W_{n,k}^I$$

are respectively the real and the imaginary part of the twiddle factor:

$$W_{n,k}^R = \cos\left(\frac{-2k\pi n}{N}\right), \text{ and} \qquad \text{eq. (6)}$$

$$W_{n,k}^I = \sin\left(\frac{-2k\pi n}{N}\right). \qquad \text{eq. (7)}$$

Computing multiple DFTs with large sizes is a computationally intensive problem. However, the sort of summing of products of individual terms, or a dot product in the vector context, can be efficiently implemented in cross-point memory array structures, such as those discussed above with respect to FIGS. 7A-7D. For example, referring FIGS. 7A and 7C, if a resistance $R_{cell}$ is programmed into the memory cell between word line $WL_1$ and bit line $BL_1$ and a voltage $V_{WL1}$ is applied to $WL_1$, the current on bit line will be $I_{BL1}=V_{WL1}/R_{cell}$, or, if rewritten in terms of conductance, $I_{BL1}=V_{WL1} G_{cell}$, where the conductance $G_{cell}=1/R_{cell}$. If multiple word lines are driven at once, the current though the individual cells will all contribute to the bit line current: $I_{BLj}=\Sigma_i V_{WLi} G_{cell\ i,j}$, where the sum is over the word lines. By storing the twiddle factors as conductances and encoding the input values as word lines voltages, the cross point memory structure based on storage class non-volatile memory can be used determine the products and sums of the real and imaginary parts, $$Y_k^R \text{ and } Y_k^I,$$

outputs. That $X_n$ and $W_{n,k}$ also can have real and imaginary parts, resulting in $$Y_k^R \text{ and } Y_k^I$$

respectively being the difference and sum of two sums, complicates the situation and to address this, $$X_n^R \text{ and } X_n^I$$

are encoded and applied as voltages to two word lines, $$WL_{2n} \text{ and } WL_{(2n+1)}; Y_k^R \text{ and } Y_k^I$$

are determined from currents on two bit lines, $BL_{2k}$ and $BL_{(2k+1)}$; and the weights $$W_{n,k}^R \text{ and } W_{n,k}^I$$

are each stored as conductances in two of the memory cells where these pairs of word lines and bit lines cross. An embodiment for this can be illustrated with respect to FIG. 8.

Figure 8:
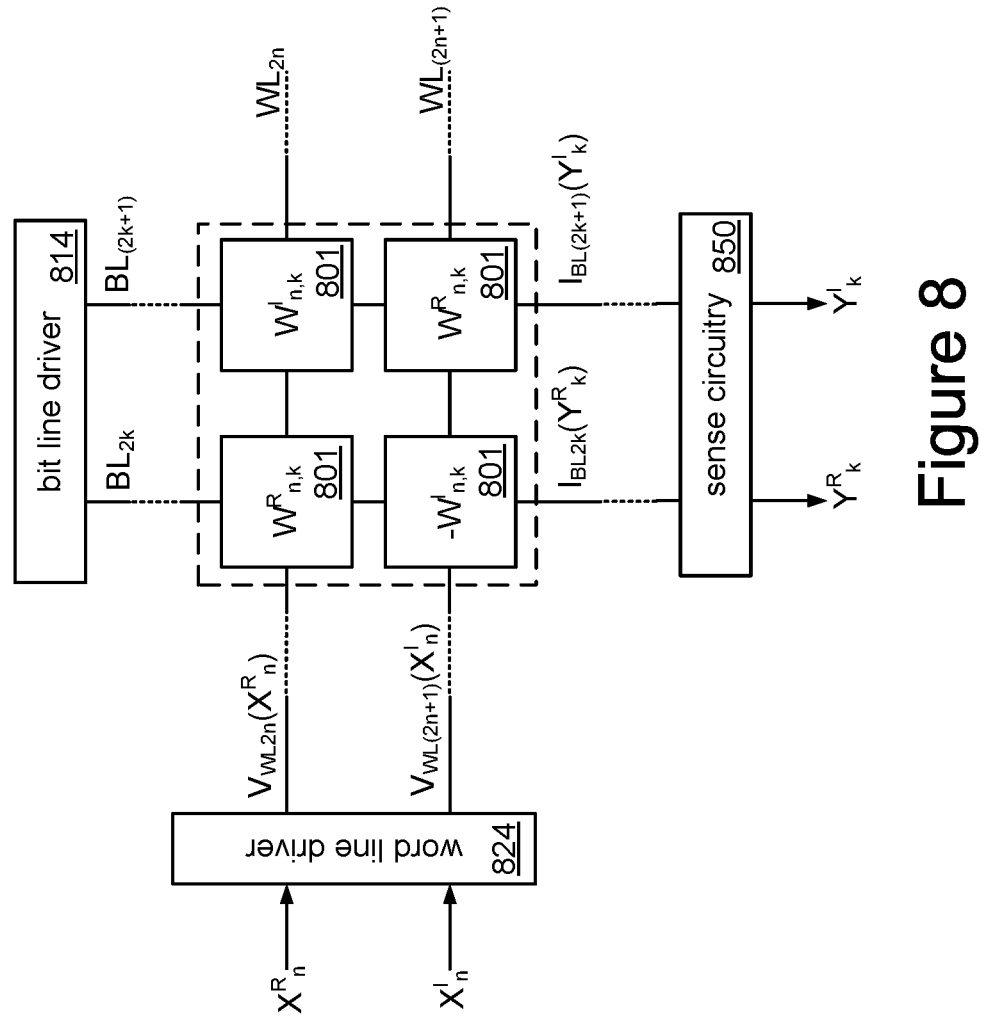
FIG. 8 illustrates the encoding and storage of complex valued twiddle factors into memory cells of a non-volatile memory array.

FIG. 8 illustrates the encoding and storage of complex valued twiddle factors into memory cells of a non-volatile memory array or arrays. The memory cells can be part of an array 502/602 of FIGS. 5 and 6A and only some elements of the control circuitry (the drivers 814 and 824 and sense circuitry 850) are shown. Although FIG. 8 represents the word lines, connected to word line driver 824, and the bit lines, connected between bit line driver 814 and sense circuitry 850, of both pairs as being adjacent, in other embodiments either set may be separated by intervening word or bit lines. As illustrated in FIG. 8, the word line driver circuitry 824 encodes the input values as: $X_n^R \rightarrow V_{WL2n}$ and $X_n^{R,I} \rightarrow V_{WL(2n+1)}$. The twiddle factors are encoded conductances that are then programmed into the memory cells 801 connected between the pair of word lines and pair of bit lines, where FIG. 8 shows the twiddle factor in the square representing the memory cell 801 rather than the corresponding conductance to make the structure easier to see, and the encoding is: $G_{2n,2k} = W_{n,k}^R$; $G_{2n,2k+1} = W_{n,k}^I$; $G_{2n+1,2k} = -W_{n,k}^I$; and $G_{2n+1,2k+1} = W_{n,k}^R$. Consequently, the real part is stored on both diagonal elements, with the imaginary part stored on the off-diagonal pair of memory cells with the minus sign introduced to reflect the minus sign between the two parts of $Y_k^R$. As the conductances are stored as non-negative values, the accommodation of negative values and techniques for effecting the needed minus signs is discussed in more detail below. Leaving aside the question of negative values, the resultant currents to the sense circuitry 850 then correspond to the output values: $I_{BL2k} \rightarrow Y_k^R$ and $I_{BL(2k+1)} \rightarrow Y_k^I$.

Figure 9:
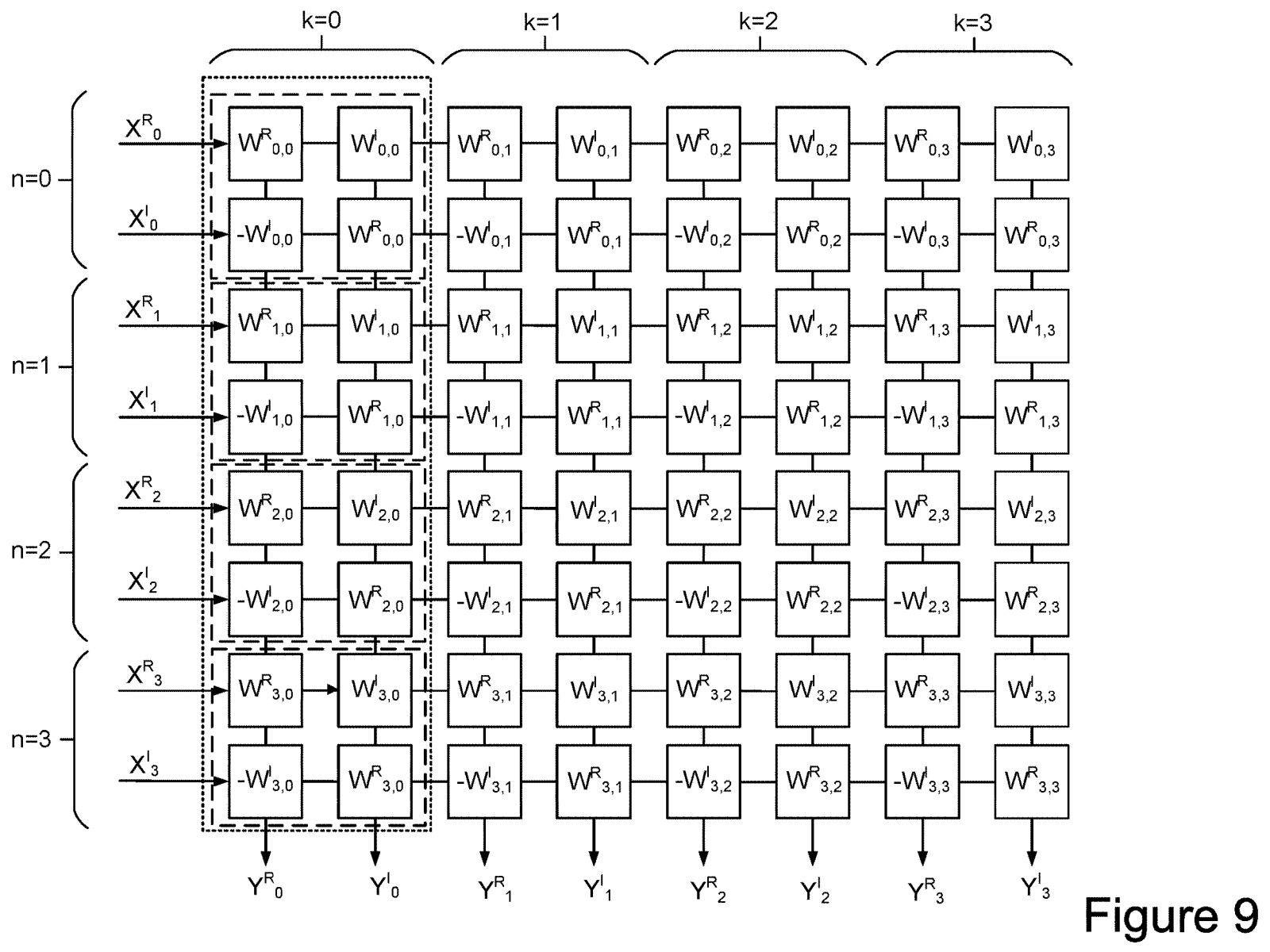

FIG. 9 illustrates an example of a 4-point discreet Fourier transformation mapped onto a memory array, where the array of FIG. 9 can correspond to part or all of array 502/602 and the drivers and other control circuits of FIGS. 5 and 6A are not shown. As this corresponds to N=4, n, k=0, 1, 2, 3 and the illustrated portion of the array is 8×8 to include real and imaginary components. Depending on the embodiment, this can be a portion of a larger array, where the particular arrangement and grouping of word lines and bit lines is chosen to simplify the discussion, but other arrangements can be used. (The incorporation of negative values is again deferred.)

As can be seen in FIG. 9, the structure of FIG. 8 is repeated for each combination of n, k values, with the corresponding twiddle factors for each pair of values programmed into each of the 2×2 sub-blocks of memory cells. Depending on the embodiment, the memory cells, again represented as the squares at the word line-bit line cross points, can be any of the various memory cell technologies (e.g., SRAM, DRAM, RRAM, PCM, MRAM) that can be adopted to support analog multipliers. The four 2×2 sub-blocks for k=0 are marked out by dashed-line boxes for each value of n, with the four blocks for different n values surrounded by the dotted-line rectangle. The real $W^R$ and imaginary $W^I$ values of the "flat" twiddle factor matrix can be pre-programmed into the memory cells as conductances, so that when the input values ($X^R$, $X_I$) values are runtime programmed to word line voltages, the output values ($Y^R$, $Y^I$) values are generated as sum currents on the bit lines that can be read out. The embodiment of FIG. 9 can be called a "flat" embodiment, in that all of the twiddle factors are programmed into the memory cells, whereas embodiments presented below introduce a "folded" approach in which the same memory cells are used for multiple inputs. Although illustrated for an N=4 embodiment, this approach can be extended to support arbitrary sized discrete Fourier transformations, where large scale DFTs can be supported by leveraging large and/or multiple memory arrays.

Referring back to equation (3), the real and imaginary parts of the twiddle factors are respectively cosine and sine functions and, consequently, will have both positive and negative values. Additionally, referring to equations (4) and (5), the minus sign between the factors in equation (4) means that even in the case that both the real and imaginary input values ($X^R$, $X^I$) are positive and the real part of the twiddle factors, $$W_{n,k}^R,$$

are positive, there will be negative contributions to the sum of one or both of equations (4) and (5) whether $$W_{n,k}^I$$

is positive or negative, as reflected in the off-diagonals in the memory cells for FIG. 8 having a relative minus sign. For the in-memory computation of discreet Fourier transforms presented here, the twiddle factors are encoded as conductance programmed into memory cells, the inputs are encoded as voltage levels, and the outputs are encoded as current levels. As the resistance/conductance levels of the memory cells in technologies presented above are non-negative, to fully compute all of the contributions to equations (4) and (5), an accommodation is needed for what would be negative valued entries for the conductance values. It is also preferable in most circuitry to deal with only non-negative voltage and current values for encoded input and output values.

To accommodate negative values, the positive valued and negative valued contributions can be computed separately and then subtracted from each other. For example, if the twiddle factors $W_{i,j}$ along a bit line $BL_j$ would be encoded as conductances $G_{cell\ i,j}$ and the inputs $X_i$ would be encoded as to produce a current $I_{BLj}$ corresponding to output $Y_j$ would, if positive and negative values were used, be $I_{BLj} = \Sigma_i\ V_{WLi}\ G_{cell\ i,j}$. To be able to just use positive quantities, the sign of the quantities can be accounted by as follows:

$$I_{BLj} \to \sum_i (\text{sign } X_i)(\text{sign } W_{i,j})|V_{WLi}||G_{cell,j}| = \qquad \text{eq. (8)}$$

$$I_{BLj}^{++} - I_{BLj}^{+-} - I_{BLj}^{-+} + I_{BLj}^{--},$$

where (sign $X_i$) and (sign $W_{i,j}$) are (+1) or (−1) depending on whether $X_i$ and $W_{i,j}$ are positive or negative quantities, and $$I_{BLj}^{++},\ I_{BLj}^{+-},\ I_{BLj}^{-+},\ \text{and}\ I_{BLj}^{--}$$

are respectively (referring to the (sign $X_i$) and (sign $W_{i,j}$) values) the (+)(+), (+)(−), (−)(+), and (−)(−) contributions to the total output. These different contributions can be performed in-memory using different bit lines, whether in the same or different arrays, or sharing bit lines and performing and accumulating multiple sensing operations. For example, positive and negative twiddle factors could be stored on different word lines of same bit line, with positive and negative inputs respectively applied to obtain $$(I_{BLj}^{++} + I_{BLj}^{--}),$$

after which the inputs could swapped to generate $$(I_{BLj}^{-+} + I_{BLj}^{+-}),$$

which is then subtracted from the first operation. Alternately, the four values could be computed individually on different word lines of the same array or of different arrays, the results accumulated, and then added/subtracted.

Referring back again to equation (4), to account for the minus sign between the factors an additional minus sign needs to be introduced (i.e., (sign $W_{i,j}$)→−(sign $W_{i,j}$) for such terms in equation (8) and it would be |−$W_{i,j}$| that would be encoded as conductance for the computation of the current $I_{BL2k}$ corresponding to $Y^R_k$. The incorporation of negatively valued twiddle factors and inputs is discussed in more detail below with respect to FIG. 14, after discussing some variations and alternate embodiments. In the next portion of the discussion, only the positive valued parts of the quantities are considered to simplify the discussion, but it will be understood that negatively valued quantities can be introduced as described briefly above and in more detail further below.

Going back to equations (6) and (7), the real and imaginary components of the twiddle factors $$W_{n,k}^R\ \text{and}\ W_{n,k}^I$$

are respectively cosine and sine functions and, as such, have a cyclic behavior based on their arguments. For example, again looking at the N=4 example, when k is an odd number, then:

$$W_{n+N/2,k}^R = \cos\left(\frac{-2k\pi(n+N/2)}{N}\right) = \cos\left(\frac{-2k\pi n}{N}\right) = W_{n,k}^R,\ \text{and}$$

$$W_{n+N/2,k}^I = \sin\left(\frac{-2k\pi(n+N/2)}{N}\right) = \sin\left(\frac{-2k\pi n}{N}\right) = W_{n,k}^I.$$

Consequently, the twiddle factors repeat with a cycle of N/2 and the memory array of twiddle factors can be simplified by folding every N/2 rows. This is illustrated for the N=4 example in FIG. 10.

Figure 10:
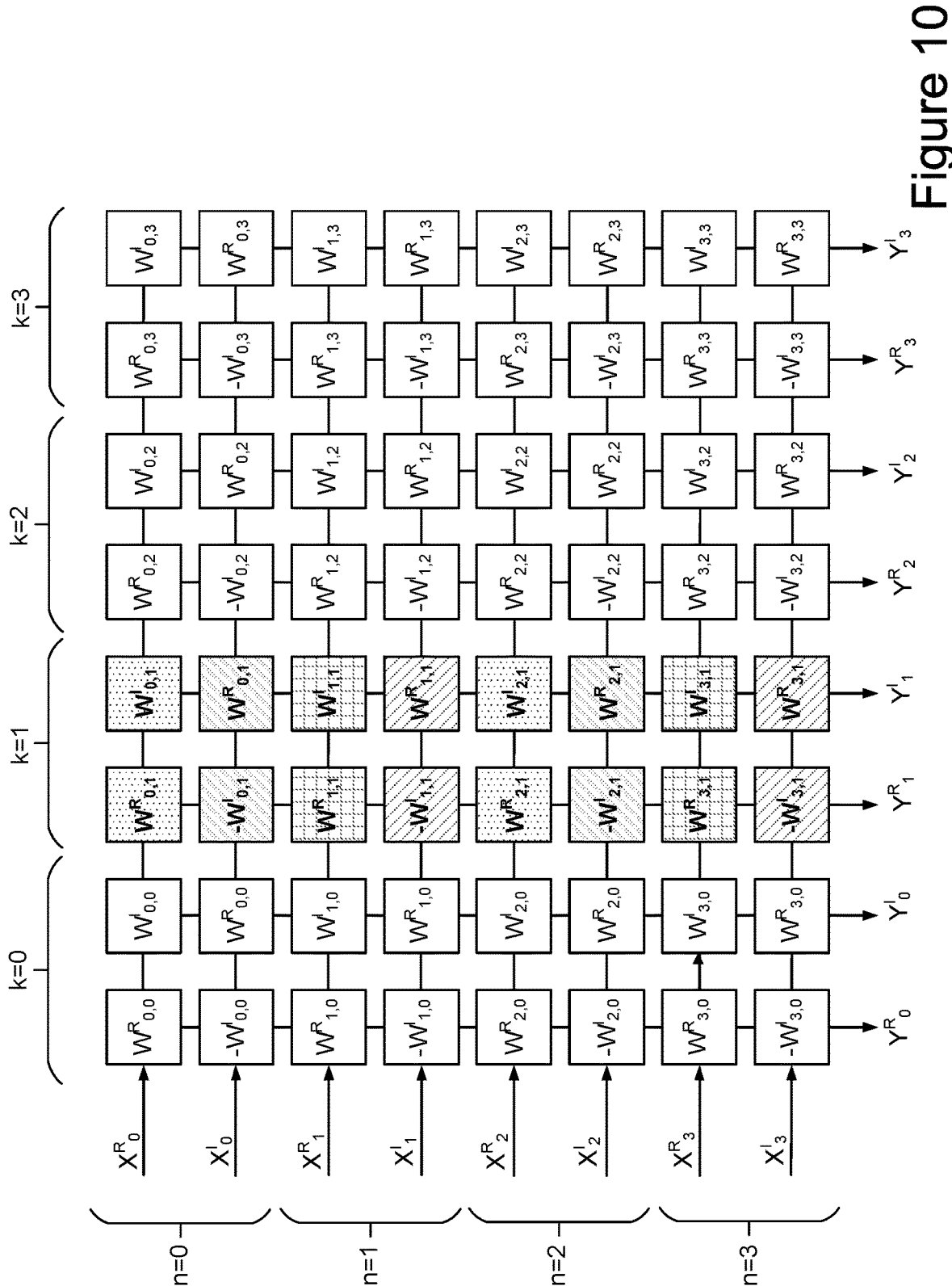
FIGS. 10 and 11 repeat the elements of FIG. 9, but highlights the cyclic behavior of the twiddle factors.

FIG. 10 repeats the elements of FIG. 9, but highlights the cyclic behavior of the twiddle factors. In FIG. 10, the memory cells of the k=1 column have (relative to FIG. 9) been patterned to illustrate how the twiddle factor repeat every fourth bit line. Consequently, the conductance values programmed into the memory cells along the n=0 and n=1 word line pairs for k=1, and other odd-k values for the bit lines, are the same as for the memory cells along the n=2 and n=3 word line pairs. Consequently, to perform a "flat" in-memory computation for the k=1 column, the twiddle factors can be programmed into the word lines corresponding to n=0, 1, 2, 3 and the input voltages applied concurrently for the word lines corresponding to n=0, 1, 2, 3 to generate the real and imaginary component output currents for k=1 in a single process. Alternately, in a "folded" embodiment, the cyclic behavior of the twiddle factors can be used to program into the word lines corresponding to n=0, 1 and sequentially apply the input voltages corresponding to n=0, 1 to generate and then accumulate the real and imaginary component output currents for k=1 and n=0, 1, and then apply the input voltages corresponding to n=2, 3 to the n=0, 1 to generate the real and imaginary component output currents for k=1 and n=2, 3, which is then added to the n=0, contributions. This use of a folded embodiment uses less memory space as only a subset of less than all of the full set of basis values are stored, but will still allow for all of the output components to be determined.

When k is an even number, then the real and imaginary twiddle factors in the N=4 example have the following cyclic properties:

$$W_{n+N/4,k}^R = \cos\left(\frac{-2k\pi(n+N/4)}{N}\right) = \cos\left(\frac{-2k\pi n}{N}\right) = W_{n,k}^R,\ \text{and}$$

$$W_{n+N/4,k}^I = \sin\left(\frac{-2k\pi(n+N/4)}{N}\right) = \sin\left(\frac{-2k\pi n}{N}\right) = W_{n,k}^I.$$

Consequently, the twiddle factors repeat with a cycle of N/4 and the memory array of twiddle factors can be simplified by folding every N/4 rows. This is illustrated for the N=4 example in FIG. 11.

Figure 11:
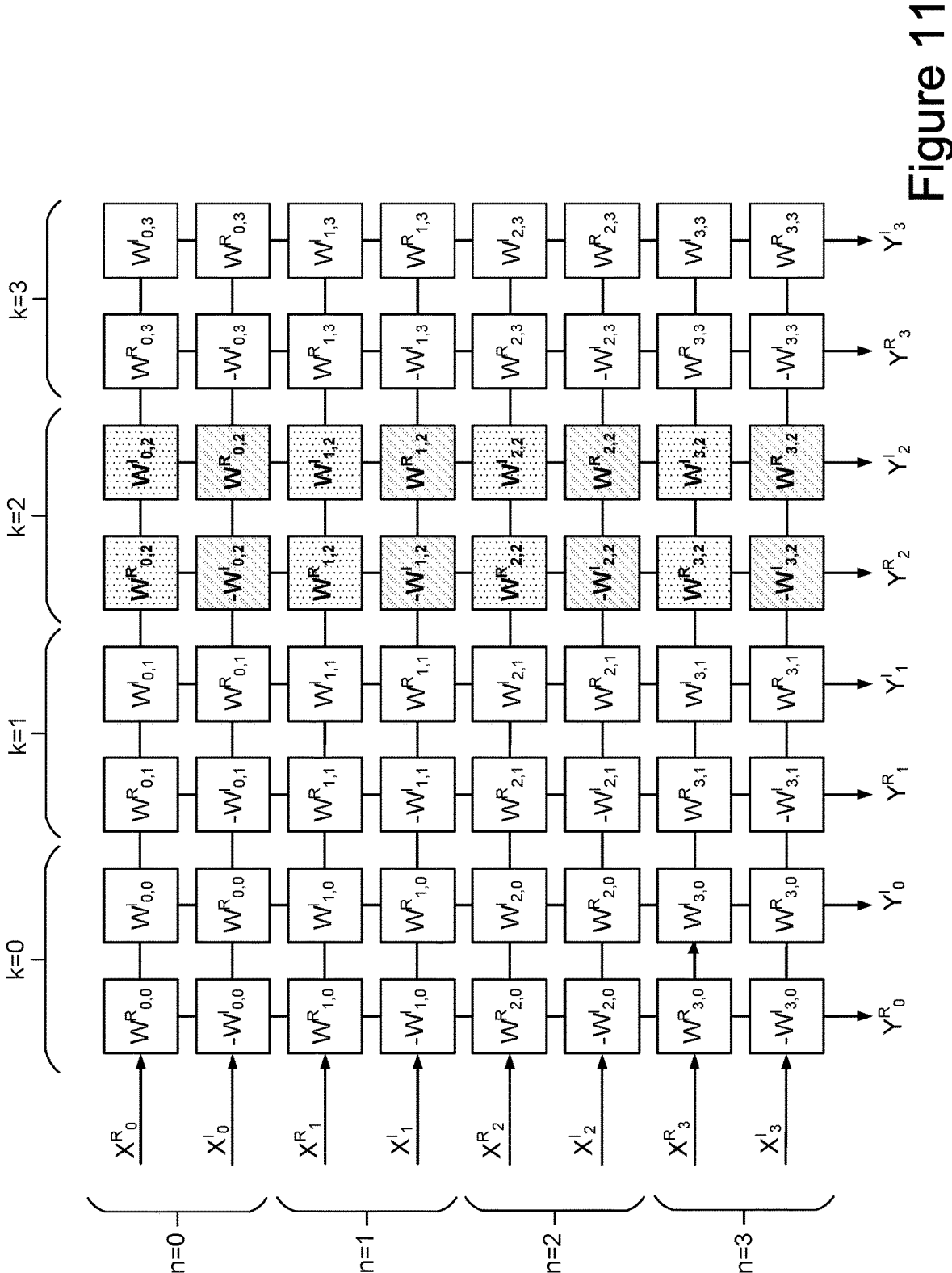

FIG. 11 again repeats the elements of FIG. 9, but highlights the cyclic behavior of the twiddle factors. In FIG. 11, the memory cells of the k=2 column have (relative to FIG. 9) been patterned to illustrate how the twiddle factor repeat every second bit line. Consequently, the conductance values programmed into the memory cells along the n=0 word line pairs for k=2, and other even-k values for the bit lines, repeat for each of the word line pairs. Consequently, to perform a "flat" in-memory computation for the k=2 column, the twiddle factors can be programmed into the word lines corresponding to n=0, 1, 2, 3 and the input voltages applied concurrently for the word lines corresponding to n=0, 1, 2, 3 to generate the real and imaginary component output currents for k=2 in a single process. Alternately, in a "folded" embodiment, the cyclic behavior of the twiddle factors can be used to program into the word lines corresponding to n=0 and sequentially apply the input voltages to n=0, 1, 2, 3 word line pairs to generate and then accumulate the real and imaginary component output currents for k=2. Note that as an array storing even-k values can by simplified by folding every N/4 rows, it can also be folded by half as much and folded even N/2 rows, as is the case for the odd-k values.

Referring back to equations (6) and (7), the structure of the twiddle factors also means that the twiddle factors for a given N value will also be a subset of the twiddle factors of multiples of this value. Consequently, if, for example, the twiddle factors are stored in the memory array or arrays for 6N, sub-sets of these will correspond to the twiddle factors for N, 2N, and 3N. To take a specific example, if the twiddle factors for N=12 are stored in the memory, subsets of these can also be used for computing discrete Fourier transformations for N=6, 4, 3, or 2.

The use of folding reduces the amount of memory used to store the twiddle factors, but, as inputs are entered sequentially, lowers the amount of parallelism. An un-folded, flat embodiment allows higher parallelism, but, as all of the twiddle factors are stored in the memory, has a higher memory requirement. Consequently, the amount of folding used in storing the twiddle factors can be selected based on the requirements of a particular application.

Figure 12:
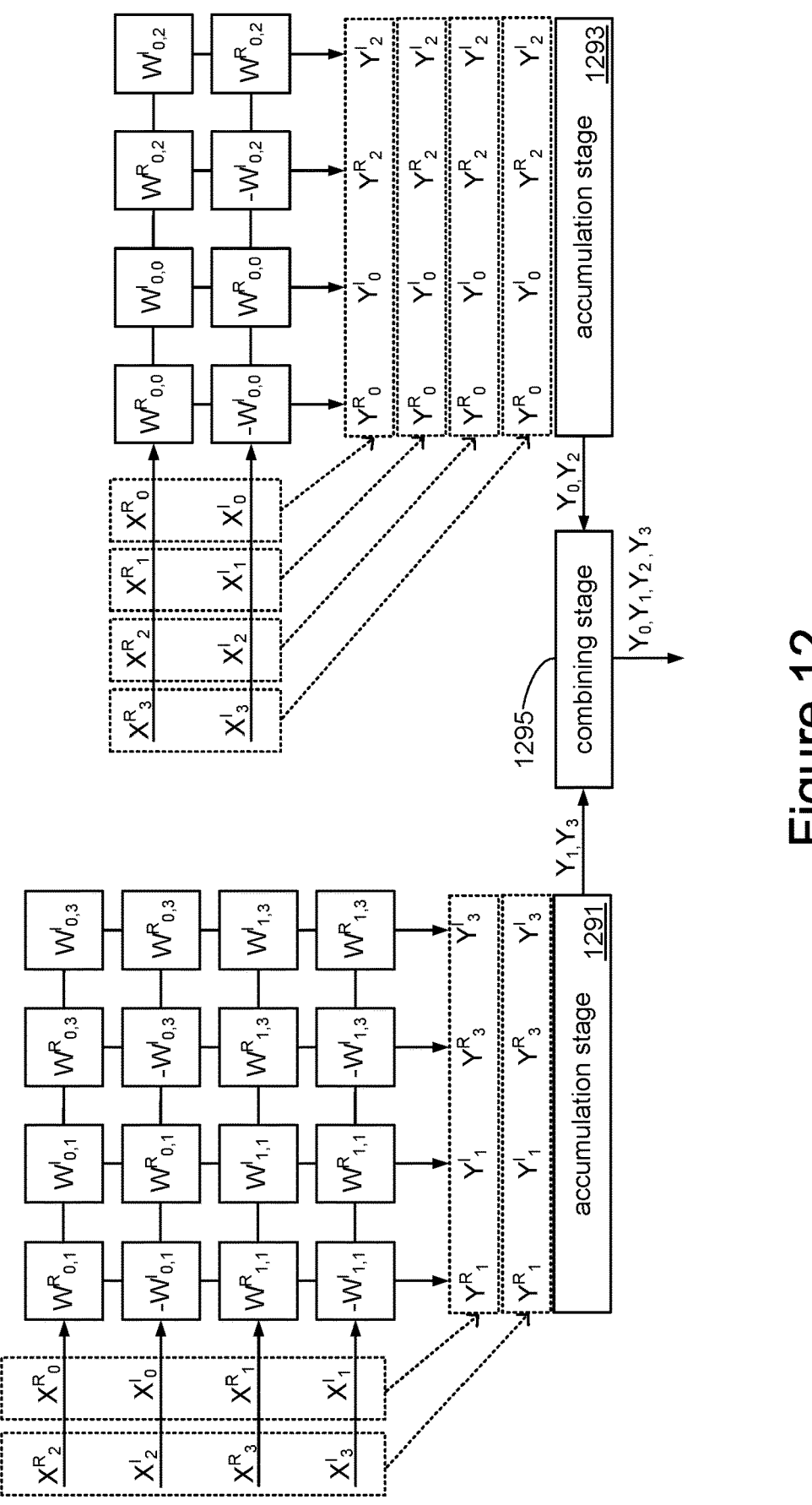
FIG. 12 illustrates an embodiment of the folding of discrete Fourier transformation basis parameters using memory arrays.

FIG. 12 illustrates an embodiment of folding of discrete Fourier transformations using memory arrays, again using an N=4 point example. As discussed above, for the columns with k=odd number values, a 2-folding can be used; and for the columns with k=even number values, a 2-folding or a 4-folding can be used. In the example of FIG. 12, for k=odd a 2-folding is used and for k=even a 4-folding is used. This embodiment minimizes memory requirements, but decreases parallelism.

The "flat" twiddle factor (W) matrix of memory cells in FIG. 9 is vertically symmetric, so that it is possible to reduce the number of required memory cells by folding W by factor of K, where K=2 (for even or odd k values) or 4 (for even k values). This allows for the number of twiddle factors stored to be decreased by 1/K, reducing the memory requirement and power consumption by a corresponding factor of 1/K. The input value data are serially programmed as voltage levels on the word lines of memory arrays, with, for each of the input values, the corresponding output results are serially read out from the bit lines of the memory array or arrays.

The example of FIG. 12 shows the odd-k columns with a 2-fold folding on the left and the even-k columns with a 4-fold folding on the right. Although represented separately in FIG. 12, a number of different embodiments are possible. For example, the two sets of memory cells (odd-k and even-k) could be stored on different arrays to increase parallelism, different portions of the same array, or the with word line and/or bit lines interleaved in the same array. For the 4-fold odd k values, the four sets of real and imaginary inputs are entered sequentially into the 2×2 blocks of twiddle factors. In this embodiment, the inputs are entered in the sequence n=0, 1, 2, and then 3, but other orders can be used. The broken arrows illustrate the correspondence between the sets of serial inputs and the resultant serial outputs, which are then accumulated in the accumulation stage 1293. For the 2-fold even k values, the two sets of real and imaginary n=0, 1 inputs are entered sequentially into the corresponding 2×2 blocks of twiddle factors, followed by the n=2, 3 inputs, but other orders can be used. The broken arrows illustrate the correspondence between the sets of serial inputs and the resultant serial outputs, which are then accumulated in the accumulation stage 1291. The odd-k and even-k values from the accumulation stages 1291 and 1293 are then combined in the combining stage 1295 to provide the real and imaginary parts of the full set of outputs. The accumulation stages 1291 and 1293 and the combining stage 1295 can be included into the sense amps 550/650 or other elements of the column control circuitry 510/610 of FIGS. 5 and 6A.

Figure 13:
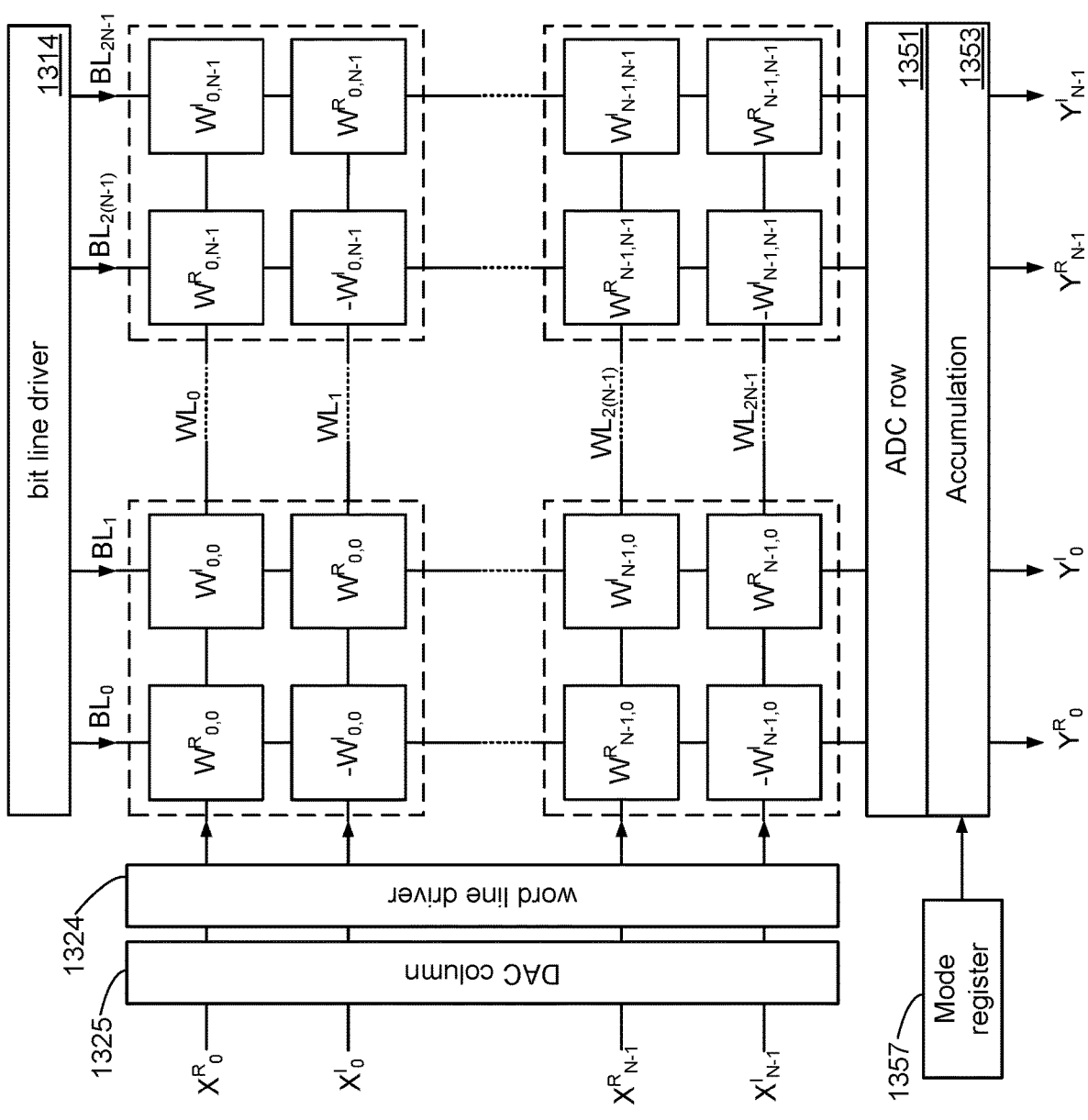
FIG. 13 illustrates an embodiment for the in-memory computation of N-point fixed-point discrete Fourier transformations for quantized input data and twiddle factors.

FIG. 13 illustrates an embodiment for the in-memory computation of N-point fixed-point discrete Fourier transformations for quantized input data and twiddle factors. Similarly to FIGS. 8 and 9, FIG. 13 again shows an array memory cells arranged as 2×2 blocks of memory cells storing the real and imaginary parts of a twiddle factor, where the memory cells can again be, for example, storage class memory such as MRAN, PCM, or ReRAM memory. A fixed-point discrete Fourier transformation uses quantized input data (X) and twiddle factors (W). The error between the fixed-point discrete Fourier transformation and a floating-point discrete Fourier transformation depends on the number of quantization level for twiddle factors and input data, where the twiddle factors and data inputs can have different quantized levels and the optimal quantized levels can be chosen based on the size (N) of the discrete Fourier transformation, which is application dependent.

The embodiment of FIG. 13 is an N-point embodiment in which there are N×N twiddle factors (for both real and imaginary components), N input values (again for both the real and imaginary components), and N output (for each of the real and imaginary) components. The real and imaginary twiddle factors are, as discussed with respect to FIG. 8, stored as 2×2 blocks. The real and imaginary components, $X^R_{[N-1:0]}$ and $X^I_{[N-1:1]}$, are digital values provided as inputs to a digital-to-analog converter 1325 for columns that provide its analog output to the word line driver 1324 to apply the corresponding word line voltages to the memory array or arrays. The bit lines are connected between the bit line driver 1314 and the row analog-to-digital converter 1351. The currents generated along the bit lines are received at the row analog-to-digital converter 1351 and, when enabled, accumulated at the accumulator 1353 for the sensing operations. A mode register 1357 can be used to enable/disable the accumulator 1353 with respect to whether the embodiment is using a flat or a folded mapping scheme of the twiddle factors into the memory array or arrays. Depending on the embodiment, the location and implementation of accumulation unit 1353 can vary depending on the bit precision requirement. When located before the ADC circuitry 1351, the analog sum current on each bit line is accumulated as charge on a charge capacitor associated with the same bit line; and, alternately, if the accumulation unit 1353 is located (as shown in FIG. 13) after the ADC circuitry 1351, the digital sum current on each bit line is accumulated by a digital multiply and accumulate circuit associated with the same bit line.

Figure 14:
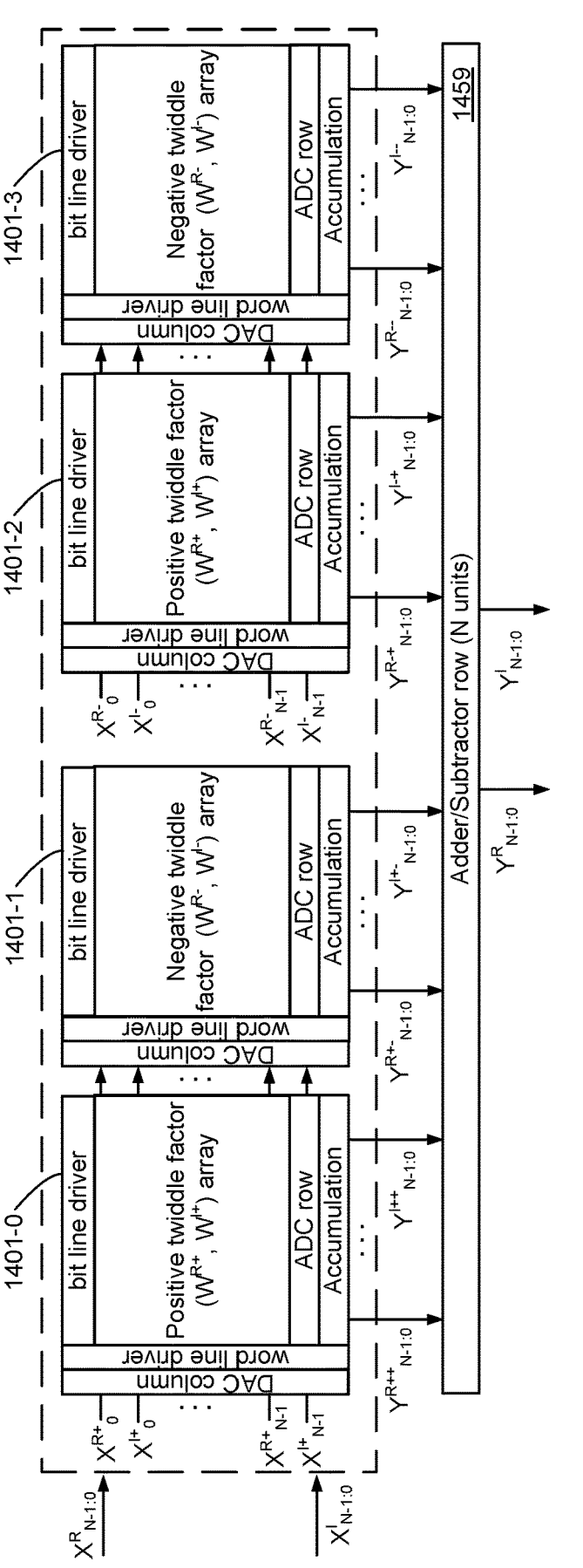
FIG. 14 illustrates an embodiment for the computation of N-point discrete Fourier transformations with signed inputs and signed twiddle factors using memory arrays.

Returning now to the incorporation of negative quantities for the twiddle factors, as can be seen from the functional form of the twiddle factors in equations (6) and (7), depending on the k, n, and N values, either of the real and imaginary part of a twiddle factor can be negative. Additionally, referring to equations (4) and (5), both $W_{n,k}^{I}$ and $-W_{n,k}^{I}$ are found in these equations, so that for any non-zero imaginary part of a twiddle factor both a positive and a negative quantity will be present, as illustrated by the anti-diagonal elements in the basic 2×2 block of FIG. 8. FIG. 14 illustrates an embodiment for handling signed inputs and signed twiddle factors for in-memory computation of discrete Fourier transformations.

FIG. 14 illustrates an embodiment for the computation of N-point discrete Fourier transformations with signed inputs and signed twiddle factors using memory arrays. The embodiment maps positive and negative real/imaginary parts of input data and twiddle factors to 4 different sets of memory cells in four arrays 1401-0, 1401-1, 1401-2, and 1401-3. Both twiddle factors and inputs are encoded as their absolute values as memory cell conductances and word line voltages, respectively, with negative signs accounted for in the adder/subtractor row units 1459. The four arrays 1401-0, 1401-1, 1401-2, and 1401-3 correspond to the four combinations of positive and negative values for the inputs and twiddle factors and use the following mapping scheme:

$X_i^{R+}$, $X_i^{I+}$: Positive Real and Imaginary part of input i $X_i^{R-}$, $X_i^{I-}$: Negative Real and Imaginary part of input i $W_i^{R+}$, $W_i^{I+}$: Positive Real and Imaginary part of twiddle factor i $W_i^{R-}$, $W_i^{I-}$: Negative Real and Imaginary part of twiddle factor i $Y_i^{R+}$, $Y_i^{I+}$: Positive Real and Imaginary part of output i $Y_i^{R-}$, $Y_i^{I-}$: Negative Real and Imaginary part of output i

[N-1:0] subscript: vector of N elements

Referring now back to FIG. 8 and the basic 2×2 storage block for the real and imaginary parts of a twiddle factor, it can be seen that, as noted above, both $W_{n,k}^{I}$ and $-W_{n,k}^{I}$ are used to compute the outputs (Y) from the inputs (X). Consequently, for the word lines corresponding to the $X^{I}$ values, it will be the $-W_{n,k}^{1}$ twiddle factors that are stored according whether this is a positive or negative quantity.

In the embodiment of FIG. 14, each of the arrays is as described with respect to FIG. 13 and includes a digital-to-analog converter for the input values and an analog-to-digital converter prior to the accumulation unit. Each of the arrays can arrays can store the twiddle factor matrices in either a flat or folded embodiment, where the configuration can be again selected by a mode register (corresponding to 1357 of FIG. 13, but not shown in FIG. 14) to enable/disable the corresponding accumulation unit. The following table illustrates the assignment of positive and negative quantities, where +, − superscript respectively corresponds to the positive and negative quantities:

| Array index | Input (X) | Twiddle factor (W) | Array output |
|---|---|---|---|
| 0 | $X^{R+}$, $X^{I+}$ | $W^{R+}$, $W^{I+}$ | $Y^{R++}$, $Y^{I++}$ |
| 1 | $X^{R+}$, $X^{I+}$ | $W^{R-}$, $W^{I-}$ | $Y^{R+-}$, $Y^{I+-}$ |
| 2 | $X^{R-}$, $X^{I-}$ | $W^{R+}$, $W^{I+}$ | $Y^{R-+}$, $Y^{I-+}$ |
| 3 | $X^{R-}$, $X^{I-}$ | $W^{R-}$, $W^{I-}$ | $Y^{R--}$, $Y^{I--}$ |

All non-zero twiddle factors will consequently have a conductance corresponding to their absolute value entered in the array for either the positive or negative array, with a conductance value of zero entered in the other (i.e., if a real part of a given twiddle factor is positive, it is entered into the corresponding memory cell of the $W^{R+}$ arrays and a zero in the corresponding memory cell of the $W^{R-}$ and vice versa).

The different contributions of the real and imaginary outputs can then be combined using the adder/subtractor row units 1459 to combine the real and imaginary final output of the mapped memory arrays the linear combinations of final output=Output(array–0)–Output(array–1)–Output(array–2)–Output(array–4):

$$Y_{[N-1:0]}^{R} = Y_{[N-1:0]}^{R++} - Y_{[N-1:0]}^{R+-} - Y_{[N-1:0]}^{R-+} + Y^{R--}; \qquad \text{eq. (8)}$$

$$Y_{[N-1:0]}^{I} = Y_{[N-1:0]}^{I++} - Y_{[N-1:0]}^{I+-} - Y_{[N-1:0]}^{I-+} + Y^{I--}. \qquad \text{ep. (9)}$$

The adder/subtractor row units 1459 can be part of the column control circuitry 510/610 when all of the arrays are on the same memory die 500 or share the same control die 611. If the arrays do not have the same column control circuitry 510/610, the partial results from the different arrays can be transferred to a common set of control circuitry 510/610, or be implemented on the memory controller 102.

A number of variations on FIG. 14 can be used in alternate embodiments to cover negative values for twiddle factors and inputs. FIG. 14 allows for a high degree of parallelism, but requires all of the positive and negative twiddle factors to be stored twice, but if the positive and negative inputs are entered sequentially, the twiddle factors only need to be stored once. For example, memory arrays 1401-0 and 1401-1 can have the positive and negative inputs applied sequentially and, with the appropriate sign change, be accumulated in each of the arrays, with the positive and negative twiddle factor contributions then combined in the adder/subtractor. In other variations, the negative twiddle factors can be stored into the same array as the positive twiddle factors, but on different bit lines with the minus signs accounted for. For example, 1401-0 and 1401-1 can be combined on single array, but with the accumulation block or ADC row unit incorporating the minus sign for the negative twiddle factors. All the different variations described above (folding—and different amounts of folding—or not, fixed-point or floating point) are complimentary can be combined in various ways, as these are performing the basic in-memory computation of 2×2 blocks as in FIG. 13, but accounting for sign and using different degrees/amounts of parallelism/storage based on symmetry/properties of twiddle factors.

Figure 15:
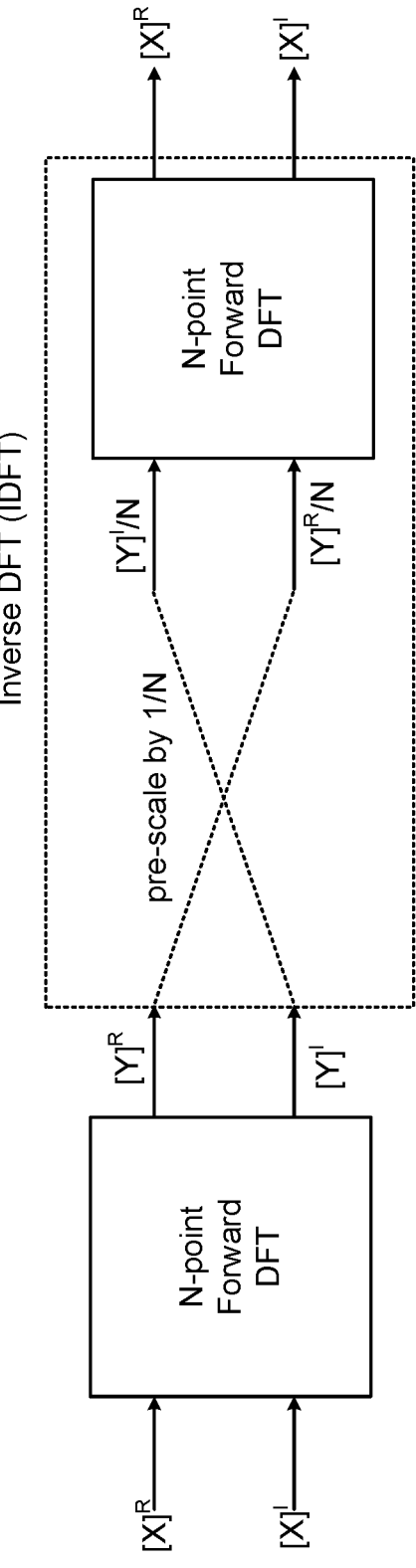
FIG. 15 is a schematic representation of the computation of an N-point inverse Fourier transformations by leveraging memory arrays for a forward Fourier transformation.

FIG. 15 is a schematic representation of the computation of an N-point inverse discrete Fourier transformations by leveraging memory arrays for a forward discrete Fourier transformation. Referring back to the discussion of equations (1) and (2), the forward and inverse Fourier transformations are of the same form, with the inputs (X) and outputs (Y) swapped and the basis, or twiddle factors being complex conjugates. Also, as noted in that discussion, in order that the inverse discrete Fourier transform of a discrete returns the original inputs, a normalization factor of 1/N is needed. Consequently, by proper accounting of these factors, a memory array storing the twiddle factors for a forward discrete Fourier transformation can also be used to compute inverse discrete Fourier transformations.

More specifically, the real and imaginary vectors $[Y]^R$ and $[Y]^I$ are pre-scaled by a factor of 1/N and the real and imaginary outputs of the forward discrete Fourier transformation are swapped with each other for the inputs of the inverse discrete Fourier transformation. The memory array with the forward discrete Fourier transformation with the swapped and scaled vectors can then be used to compute the outputs of the inverse discrete Fourier transformation, which are the same as the original inputs of forward discrete Fourier transformation. Consequently, the same array or arrays programmed with the twiddle factors of an N-point forward transformations, including the various embodiments and variations described above, can also be used for performing N-point inverse discrete Fourier transformations.

Figure 16:
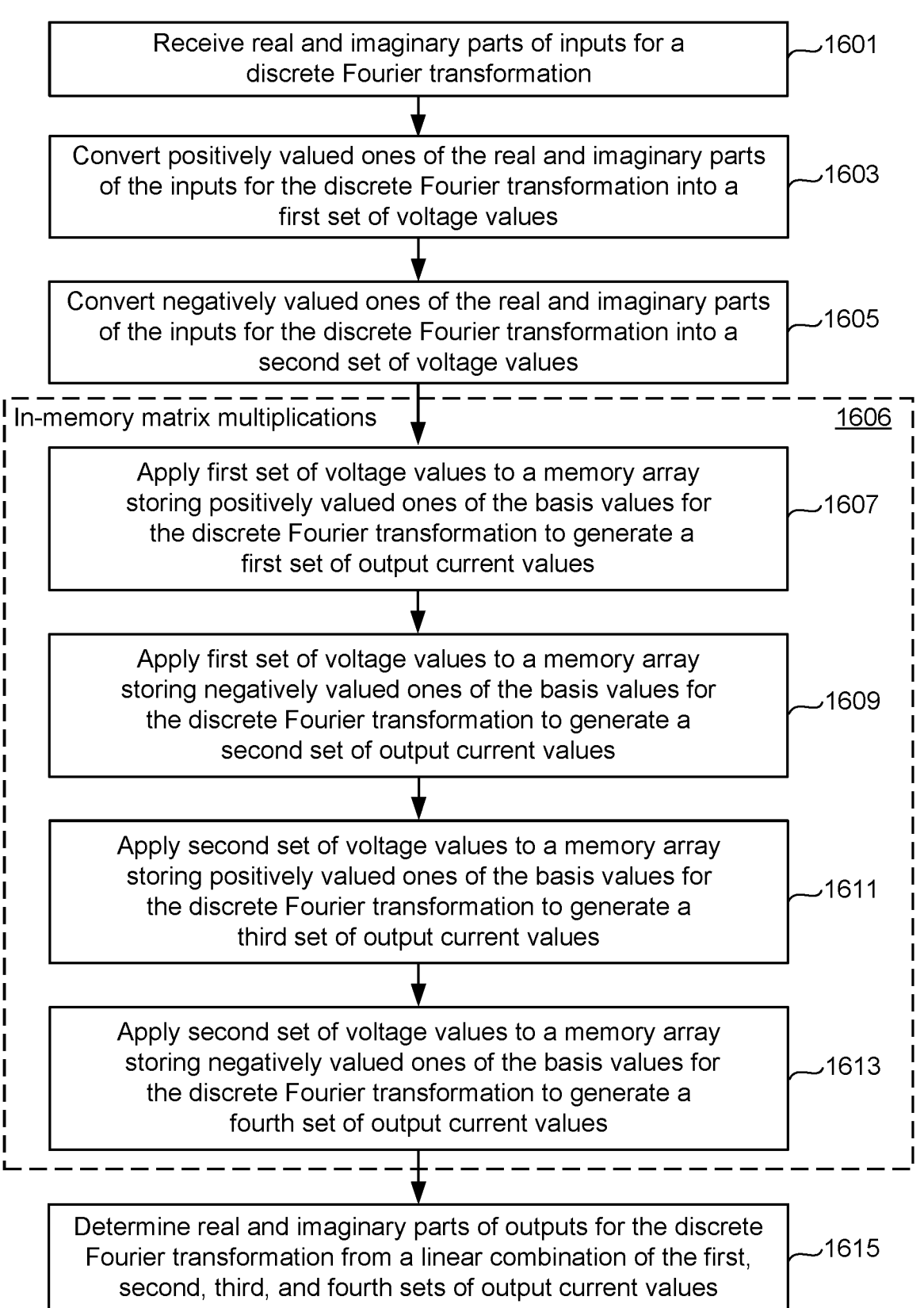
FIG. 16 is a flowchart of embodiments for implementing discrete Fourier transformations through in-memory matrix multiplication.

FIG. 16 is a flowchart of embodiments for implementing discrete Fourier transformations through in-memory matrix multiplication. Beginning at step 1601, the real and imaginary parts of the inputs for a discrete Fourier transformation are received by the non-volatile memory device. The memory device can already have the real and imaginary parts of the basis components, or twiddle factors, programmed in to one or more arrays as described above, in flat or folded formats. The inputs can, for example, be from a multi-channel spectrum analyzer or be part of pre-processing (e.g., analyzing, filtering, compression) of the data for a multi-sensor array. In the case of a wireless communication device, the inputs could be part of a modulation or demodulation process and, in some embodiments, the memory array or arrays and control circuitry can be incorporated into transmitter/receiver chips. In the case of an inverse discrete Fourier transformation, the inputs can be scaled and swapped as illustrated in FIG. 15.

At step 1603 the positively valued components of the inputs are converted into a first set of voltage values, where, for a N-point transformation, there will be N such values in the set. The negatively values components of the inputs are similarly converted into a second set of voltage values at step 1605. Referring back to FIGS. 5 and 6A, the conversion to the voltage values can be performed by the array drivers 524/624 and other elements of the row control circuitry 520/620 and system control logic 560/660. In embodiments for fixed-point discrete Fourier transformations with quantized input data, steps 1603 and 1605 can also include a digital to analog conversion, such as in the DAC column 1325 in the embodiment of FIG. 13. The first and second sets of voltage values are then applied to the memory array or arrays in step 1606.

Step 1606 is the group of in-memory matrix multiplications that generate the outputs of the discrete Fourier transformations. As discussed above, both the voltages corresponding to the inputs and the conductances corresponding to the twiddle factors are encoded as non-negative values. To account for the minus signs, four different sets of multiplications are performed using the (non-negative) encoded values to account for the four different (input)×(twiddle) factor combinations of (positive)×(positive), (positive)×(negative), (negative)×(positive), and (negative)×(negative), with the outputs then combined as a linear combination with relative minus signs introduced to account for the original signs.

More specifically, step 1606 is made up of steps 1607, 1609, 1611, and 1613. At step 1607 the first set of voltage values (i.e., positively valued inputs) are applied to one or more of the memory arrays storing positively valued ones of basis values for the discrete Fourier transformation to generate a first set of output current values. At step 1609 the first set of voltage values are applied to one or more of the memory arrays storing negatively valued ones of basis values for the discrete Fourier transformation to generate a second set of output current values. At step 1611 the second set of voltage values (i.e., negatively valued inputs) are applied to one or more of the memory arrays storing positively valued ones of basis values for the discrete Fourier transformation to generate a first set of output current values. At step 1613 the second set of voltage values (i.e., negatively valued inputs) are applied to one or more of the memory arrays storing negatively valued ones of basis values for the discrete Fourier transformation to generate a first set of output current values. The sets of voltages are applied the word lines by the word lines drivers as illustrated in FIGS. 8-14 to generate the resultant current on the bit lines.

Depending on the embodiment, steps 1607, 1609, 1611, and 1613 can be performed concurrently or sequentially in various orders, and the individually ones of these steps can use a flat embodiment, where all of a set of voltage are applied concurrently, or a folded embodiment, in which sub-sets are applied sequentially. For example, referring to FIG. 14, the multiplications of steps 1607, 1609, 1611, and 1613 can all be performed in parallel in arrays 1401-0, 1401-1, 1401-2, and 1401-3, or performed sequentially. Within each of arrays 1401-0. 1401-1, 1401-2, and 1401-3, a flat embodiment (as illustrated in FIG. 9) or a folded embodiment (as illustrated in FIG. 12) can be used. Referring again to FIG. 14, as both of arrays 1401-0 and 1401-2 store positive twiddle factors and as both of arrays 1401-1 and 1401-3 store negative twiddle factors, steps 1607 and 1611 could be performed sequentially using the same array (e.g., 1401-0), as could steps 1609 and 1613 using the same array (e.g., 1401-1), as long as the appropriated minus signs are introduced when forming the linear combinations of the outputs. The choice of embodiment and degree of parallelism can be based on considerations such as performance, power consumption, and memory usage.

At step 1615 the real and imaginary parts of outputs for the discrete Fourier transformation from a linear combination of the first, second, third, and fourth sets of output current values, where equations (8) and (9) above illustrate the introduction of +, − signs into the linear combination to account for the signs of inputs and twiddle factors. The determine of the current values and the resultant outputs for the discrete Fourier transform can be determined by the sense amplifiers 550/650 and other column control circuitry 510/610 and system control logic 560/660 of FIGS. 5 and 6A and similar elements of later figures. In the case of folded embodiments, this can include accumulation stages 1291 and 1293, as well as combining stage 1295. For embodiment providing a digital output, such as FIG. 13, the ADC row circuitry 1351 can be included, either before or after the accumulation circuitry 1353. The addition and subtraction of the different outputs can be performed by an adder/subtractor 1459 of FIG. 14 on a bit line by bit line bases to determine the real and imaginary parts of the outputs for real and imaginary components of the outputs for the discrete Fourier transformation.

According to a first set of aspects, a non-volatile memory device includes a control circuit configured to connect to a plurality of non-volatile memory arrays, each of the arrays comprising a plurality programmable resistance memory cells each connected between a corresponding word line and a corresponding bit line. The plurality of arrays includes one or more arrays configured to store positive valued components of real and imaginary parts of basis values of a discrete Fourier transformation as conductance values and one or more arrays configured to store negative valued components of the real and imaginary parts of the basis values as conductance values. The control circuit is also configured to: receive real and imaginary parts of inputs for the discrete Fourier transformation; perform a first in-memory matrix multiplication between positive valued components of the real and imaginary parts of the inputs for the discrete Fourier transformation and positive valued components of the basis values stored in a first of the plurality of arrays configured to store positive valued components of the basis values; perform a second in-memory matrix multiplication between positive valued components of the real and imaginary parts of the inputs for the discrete Fourier transformation and positive valued components of the basis values stored in a first of the plurality of arrays configured to store negative valued components of the basis values; and determine real and imaginary parts of an output of the discrete Fourier transformation of the real and imaginary parts of the inputs from differences between outputs of the first in-memory matrix multiplication and the second in-memory matrix multiplication.

In additional aspects, a method includes: receiving real and imaginary parts of inputs for a discrete Fourier transformation; converting positively valued ones of the real and imaginary parts of inputs for the discrete Fourier transformation into a first set of voltage values; and converting negatively valued ones of the real and imaginary parts of inputs for the discrete Fourier transformation into a second set of voltage values. The method further includes: applying the first set of voltage values to one of one or more non-volatile memory arrays storing positively valued ones of basis values for the discrete Fourier transformation to generate a first set of output current values; applying the first set of voltage values to one of one or more non-volatile memory arrays storing negatively valued ones of the basis values for the discrete Fourier transformation to generate a second set of output current values; applying the second set of voltage values to one of the one or more non-volatile memory arrays storing positively valued ones of the basis values for the discrete Fourier transformation to generate a third set of output current values; applying the second set of voltage values to one of the one or more non-volatile memory arrays storing negatively valued ones of the basis values for the discrete Fourier transformation to generate a fourth set of output current values; and determining real and imaginary parts of outputs for the discrete Fourier transformation from a linear combination of the first, second, third, and fourth sets of output current values.

In another set of aspects, a non-volatile memory device includes one or more non-volatile memory arrays and a control circuit configured to connect to the one or more non-volatile memory arrays. Each array comprising a plurality programmable resistance non-volatile memory cells each connected between a corresponding word line and a corresponding bit line and configured to store components of real and imaginary parts of basis values of a discrete Fourier transformation as conductance values. The control circuit further configured to: receive real and imaginary parts of inputs for the discrete Fourier transformation; sequentially apply voltage levels corresponding to the real and imaginary parts of the inputs for the discrete Fourier transformation to the word lines of the one or more arrays configured to store components of the basis values; accumulate outputs from the bit lines of the one or more arrays configured to store components of the basis values in response to sequentially applying the voltage levels; and determine real and imaginary parts of an output of the discrete Fourier transformation of the real and imaginary parts of the inputs from the accumulated outputs from the bit lines of the one or more arrays configured to store components of the basis values in response to sequentially applying the voltage levels.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory device, comprising:

a control circuit configured to connect to a plurality of non-volatile memory arrays, each of the plurality of non-volatile memory arrays comprising a plurality of programmable resistance memory cells connected between a corresponding word line and a corresponding bit line, the plurality of non-volatile memory arrays configured, individually or in combination, to store positive-valued components of real and imaginary parts of basis values of a discrete Fourier transformation as conductance values and to store negative-valued components of the real and imaginary parts of the basis values as conductance values, the control circuit further configured to:

receive real and imaginary parts of inputs for the discrete Fourier transformation;

perform, using at least one non-volatile memory array of the plurality of non-volatile memory arrays, a first in-memory matrix multiplication between positive-valued components of the real and imaginary parts of the inputs for the discrete Fourier transformation and the positive-valued components of the basis values;

perform, using at least one non-volatile memory array of the plurality of non-volatile memory arrays, a second in-memory matrix multiplication between the positive-valued components of the real and imaginary parts of the inputs and the negative-valued components of the basis values;

perform, using at least one non-volatile memory array of the plurality of non-volatile memory arrays, a third in-memory matrix multiplication between negative-valued components of the real and imaginary parts of the inputs for the discrete Fourier transformation and the positive-valued components of the basis values;

perform, using at least one non-volatile memory array of the plurality of non-volatile memory arrays, a fourth in-memory matrix multiplication between the negative-valued components of the real and imaginary parts of the inputs and the negative-valued components of the basis values;

wherein, to perform the in-memory matrix multiplications, the control circuit is further configured to separately provide to non-volatile memory arrays of the plurality of non-volatile memory arrays: i) the positive-valued components of the real and imaginary parts of the inputs for the first and second in-memory matrix multiplications and ii) the negative-valued components of the real and imaginary parts of the inputs for the third and fourth in-memory matrix multiplications; and determine real and imaginary parts of outputs of the discrete Fourier transformation of the real and imaginary parts of the inputs from a linear combination of outputs of the first in-memory matrix multiplication, outputs of the second in-memory matrix multiplication, outputs of the third in-memory matrix multiplication, and outputs of the fourth in-memory matrix multiplication.

2. The non-volatile memory device of claim 1, wherein the control circuit is formed on a control die, the non-volatile memory device further comprising:

a memory die including one or more of the plurality of non-volatile memory arrays, the memory die formed separately from and bonded to the control die.

3. The non-volatile memory device of claim 1, wherein the control circuit is further configured to:

perform the first in-memory matrix multiplication by applying voltage levels corresponding to the positive-valued components of the real and imaginary parts of the inputs to word lines of a first array of the plurality of non-volatile memory arrays, wherein a first portion of the first array is configured to store positive-valued components of the basis values;

perform the second in-memory matrix multiplication by applying the voltage levels corresponding to the positive-valued components of the real and imaginary parts of the inputs to the word lines of the first array, wherein a second portion of the first array is configured to store negative-valued components of the basis values; and determine the real and imaginary parts of outputs of the discrete Fourier transformation based at least in part from differences between outputs on bit lines of the first portion of the first array and outputs on the bit lines of the second portion of the first array in response to applying the voltage levels corresponding to the positive-valued components of the inputs to the first array.

4. The non-volatile memory device of claim 3, wherein the control circuit is further configured to:

determine the real and imaginary parts of outputs of the discrete Fourier transformation from bit line by bit line differences between outputs on the bit lines of the first portion of the first array and outputs on the bit lines of the second portion of the first array.

5. The non-volatile memory device of claim 1, wherein the control circuit is further configured to:

perform the first in-memory matrix multiplication using a first array of the plurality of non-volatile memory arrays, the first array configured to store the positive-valued components of the basis values;

perform the second in-memory matrix multiplication using a second array of the plurality of non-volatile memory arrays, the second array configured to store the negative-valued components of the basis values;

perform the third in-memory matrix multiplication using a third array of the plurality of non-volatile memory arrays, the third array configured to store the positive-valued components of the basis values; and perform the fourth in-memory matrix multiplication using a fourth array of the plurality of non-volatile memory arrays, the fourth array configured to store the negative-valued components of the basis values;

wherein word lines of the first array are connected to word lines of the second array and word lines of the third array are connected to word lines of the fourth array; and wherein the connected word lines of the first array and the second array are disconnected from the connected word lines of the third array and the fourth array.

6. The non-volatile memory device of claim 1, wherein the control circuit is further configured to:

sequentially perform the first in-memory matrix multiplication and the third in-memory matrix multiplication using a first array of the plurality of non-volatile memory arrays, the first array configured to store the positive-valued components of the basis values; and sequentially perform the second in-memory matrix multiplication and the fourth in-memory matrix multiplication using a second array of the plurality of non-volatile memory arrays, the second array configured to store the negative-valued components of the basis values;

wherein word lines of the first array are connected to word lines of the second array.

7. The non-volatile memory device of claim 1, wherein the control circuit comprises:

a digital to analog converter configured to:

receive the real and imaginary parts of the inputs as digital values; and convert the real and imaginary parts of the positive-valued components of the inputs to corresponding analog values, wherein performing the first and second in-memory matrix multiplications includes applying voltages based on the corresponding analog values, and an analog to digital converter configured to:

receive analog values for currents on bit lines of a first array and a second array of the plurality of non-volatile memory arrays, the first array configured to store the positive-valued components of the basis values and the second array configured to store the negative-valued components of the basis values; and convert the outputs of the first in-memory matrix multiplication and the outputs of the second in-memory matrix multiplication to digital values.

8. The non-volatile memory device of claim 1, wherein the control circuit is further configured to:

perform the first in-memory matrix multiplication by:

sequentially applying voltage levels corresponding to the positive-valued components of the real and imaginary parts of the inputs to word lines of a first array of the plurality of non-volatile memory arrays, the first array configured to store the positive-valued components of the basis values; and accumulating outputs from bit lines of the first array in response to sequentially applying the voltage levels to the word lines thereof;

perform the second in-memory matrix multiplication by:

sequentially applying voltage levels corresponding to the positive-valued components of the real and imaginary parts of the inputs to word lines of a second array of the plurality of non-volatile memory arrays, the second array configured to store the negative-valued components of the basis values; and accumulating outputs from bit lines of the second array in response to sequentially applying the voltage levels to the word lines thereof, and determine the real and imaginary parts of outputs of the discrete Fourier transformation of the real and imaginary parts of the inputs based at least in part from differences between the accumulated outputs of the first in-memory matrix multiplication and the second matrix multiplication.

9. The non-volatile memory device of claim 1, wherein each of the programmable resistance memory cells of the plurality of non-volatile memory arrays comprises a resistive random-access memory (Re-RAM) device.

10. The non-volatile memory device of claim 1, wherein each of the programmable resistance memory cells of the plurality of non-volatile memory arrays comprises a magnetic random-access memory (MRAM) device.

11. A method, comprising:

receiving real and imaginary parts of inputs for a discrete Fourier transformation;

converting positively valued ones of the real and imaginary parts of the inputs into a first set of voltage values;

converting negatively valued ones of the real and imaginary parts of the inputs into a second set of voltage values;

applying the first set of voltage values to one of one or more non-volatile memory arrays storing positively valued ones of basis values for the discrete Fourier transformation to generate a first set of output current values;

applying the first set of voltage values to one of one or more non-volatile memory arrays storing negatively valued ones of the basis values for the discrete Fourier transformation to generate a second set of output current values;

applying the second set of voltage values to one of the one or more non-volatile memory arrays storing the positively valued ones of the basis values to generate a third set of output current values;

applying the second set of voltage values to one of the one or more non-volatile memory arrays storing the negatively valued ones of the basis values to generate a fourth set of output current values;

wherein the first set of voltage values is separately applied from the second set of voltage values; and determining real and imaginary parts of outputs for the discrete Fourier transformation from a linear combination of the first, second, third, and fourth sets of output current values.

12. The method of claim 11, wherein:

in each of applying the first set of voltage values to one of the one or more non-volatile memory arrays storing the positively valued ones of the basis values and one of the one or more non-volatile memory arrays storing the negatively valued ones of the basis values, the first set of voltage values is applied sequentially as a plurality of subsets of the first set of voltage values;

in each of applying the second set of voltage values to one of the one or more non-volatile memory arrays storing the positively valued ones of the basis values and one of the one or more non-volatile memory arrays storing the negatively valued ones of the basis values, the second set of voltage values is applied sequentially as a plurality of subsets of the second set of voltage values; and determining the real and imaginary parts of outputs is based on accumulated values for the first, second, third, and fourth sets of output current values in response to the sequentially applied subsets of the first and second sets of voltage values.

13. A non-volatile memory device, comprising:

one or more non-volatile memory arrays, each non-volatile memory array of the one or more non-volatile memory arrays comprising a plurality of programmable resistance non-volatile memory cells, with each programmable resistance non-volatile memory cell connected between a corresponding word line and a corresponding bit line, and the one or more non-volatile memory arrays configured to store components of real and imaginary parts of basis values of a discrete Fourier transformation as conductance values; and a control circuit configured to connect to the one or more non-volatile memory arrays, the control circuit further configured to:

receive real and imaginary parts of inputs for the discrete Fourier transformation;

convert positively valued real and imaginary parts of the inputs into a first set of voltage values;

convert negatively valued real and imaginary parts of the inputs into a second set of voltage values;

sequentially apply the first set of voltage values and the second set of voltage values to the word lines of the one or more non-volatile memory arrays configured to store components of the basis values;

accumulate outputs from the bit lines of the one or more non-volatile memory arrays in response to applying the first set of voltage values or the second set of voltage values; and determine real and imaginary parts of an output of the discrete Fourier transformation of the real and imaginary parts of the inputs from the accumulated outputs from the bit lines in response to sequentially applying the first set of voltage values and the second set of voltage values.

14. The non-volatile memory device of claim 13, wherein the control circuit is formed on a control die and the one or more non-volatile memory arrays are formed on one or more memory dies formed separately from and bonded to the control die.

15. The non-volatile memory device of claim 13, wherein the programmable resistance non-volatile memory cells store components of the real and imaginary parts of a subset of a full set of basis values of the discrete Fourier transformation.

16. The non-volatile memory device of claim 13, wherein the control circuit comprises:

a digital to analog converter configured to:

receive the real and imaginary parts of inputs for the discrete Fourier transformation as digital values; and convert the real and imaginary parts of the inputs for the discrete Fourier transformation to analog values corresponding to the applied voltage levels; and an analog to digital converter configured to:

receive the outputs from the bit lines of the one or more non-volatile memory arrays as analog values; and convert the outputs from the bit lines to digital values.

17. The non-volatile memory device of claim 16, wherein the control circuit is further configured to convert the outputs from the bit lines to digital values prior to accumulating the outputs.

18. The non-volatile memory device of claim 16, wherein the control circuit is further configured to convert the outputs from the bit lines to digital values after accumulating the outputs.

19. The non-volatile memory device of claim 13, wherein each of the programmable resistance non-volatile memory cells comprises a resistive random-access memory (ReRAM) device.

20. The non-volatile memory device of claim 13, wherein each of the programmable resistance non-volatile memory cells comprises a magnetic random-access memory (MRAM) device.

\* \* \* \* \*